US012780680B2

(12) United States Patent
Arribio et al.

(10) Patent No.: US 12,780,680 B2
(45) Date of Patent: Nov. 3, 2026

(54) MIXED VALENCE SOL-GELS FOR HIGH REFRACTIVE INDEX, TRANSPARENT OPTICAL COATINGS

(71) Applicant: MERCK PATENT GMBH, Darmstadt (DE)

(72) Inventors: Alejo Lifschitz Arribio, Redmond, WA (US); Anthony Phan, Redmond, WA (US); Oliver Doll, Dietzenbach (DE); Sophia Buhbut, Ashkelon (IL); Andreas Berkefeld, Darmstadt (DE); Simon Siemianowski, Rossdorf (DE); Manuel Hamburger, Mannheim (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 18/886,382

(22) Filed: Sep. 16, 2024

(65) Prior Publication Data

US 2025/0011185 A1 Jan. 9, 2025

Related U.S. Application Data

(63) Continuation of application No. 18/147,686, filed on Dec. 28, 2022.

(Continued)

(51) Int. Cl.
*C01G 19/04* (2006.01)
*C09D 1/00* (2006.01)
*G02B 1/10* (2015.01)

(52) U.S. Cl.
CPC ............... *C01G 19/04* (2013.01); *C09D 1/00* (2013.01); *G02B 1/10* (2013.01)

(58) Field of Classification Search
None
See application file for complete search history.

(56) References Cited

U.S. PATENT DOCUMENTS 11,391,950 B2 7/2022 Calafiore
2006/0131238 A1 6/2006 Xu (Continued)

FOREIGN PATENT DOCUMENTS

JP H10147892 A 6/1998

OTHER PUBLICATIONS

Aswathy et al., "Deposition of Tin Oxide Thin Film by Sol-Gel Dip Coating Technique and its Characterization," AIP Conference Proceedings, Oct. 29, 2019, vol. 2162, No. 1.*

(Continued)

*Primary Examiner* — Michael P. Rodriguez
(74) *Attorney, Agent, or Firm* — Millen, White, Zelano & Branigan, P.C.; Brion P. Heaney

(57) ABSTRACT

Techniques disclosed herein relate to sol-gel materials that include at least one metal halide precursor and at least one alcohol. After being annealed, the metal in the metal halide is in at least two different oxidation states, both of which are stable and transparent to visible light. By producing a mixture of the same metal in multiple oxidation states that are all transparent to visible light, an amorphous state of the sol-gel material without any noticeable domain formation that would otherwise distribute stress locally and lead to voiding inside nano-gratings to be overcoated is obtained. Highly condensed states of the sol-gel have refractive index values in the 1.7-2.2 range, without sacrificing recessed-feature fill.

12 Claims, 16 Drawing Sheets

Related U.S. Application Data

(60) Provisional application No. 63/301,850, filed on Jan. 21, 2022.

(56) References Cited

U.S. PATENT DOCUMENTS

| | | | |
|---|---|---|---|
| 2008/0022896 A1 | 1/2008 | Karkkainen | |
| 2017/0121821 A1 | 5/2017 | Phillips et al. | |
| 2017/0199313 A1* | 7/2017 | Fukuda | G02B 1/14 |
| 2018/0105719 A1 | 4/2018 | Hintermann et al. | |
| 2023/0257279 A1 | 8/2023 | Lifschitz Arribio et al. | |
| 2025/0034404 A1 | 1/2025 | Lifschitz Arribio | |

OTHER PUBLICATIONS

Sehrish et al., "Tin Oxide Thin Films Prepared by Sol-Gel for PV Applications," Materials Today: Proceedings, Dec. 4, 2015, vol. 2, No. 2, pp. 5793-5798.*

Marikkannan et al., "A Novel Synthesis of Tin Oxide Thin Films by the Sol-Gel Process for Optoelectronic Applications," AIP Advances, American Institute of Physics, Feb. 13, 2015, vol. 5, No. 2.*

Aswathy B.R., et al., "Deposition of Tin Oxide Thin Film by Sol-Gel Dip Coating Technique and its Characterization," AIP Conference Proceedings, Oct. 29, 2019, vol. 2162, No. 1,6 pages.

Barhoum M., et al., Rapid Sol-Gel Fabrication of High-Quality Thin-Film Stacks on Planar and Curved Substrates, Chemistry of Materials, 2011,23(23), pp. 5177-5184.

Blanco E., et al., Insights into the Annealing Process of Sol-Gel TiO2 Films Leading to Anatase Development: The Interrelationship between Microstructure and Optical Properties, Applied Surface Science, 2018, vol. 439, 32 pages.

Coppens P., et al., Crystallography and Properties of Polyoxotitanate Nanoclusters, Chemical Reviews, May 2014, vol. 114, pp. 9645-9661.

Gareso P.L., et al., Influence of Annealing on Structural and Optical Properties of n-TiO2 Thin Films Grown by Sol-Gel Spin Coating, Journal of Physics: Conference Series, 2019, vol. 1242, 012037, 8 pages.

Goldsmith S., et al., "Modeling the Optical Properties of Tin Oxide Thin Films," Thin Solid Films, vol. 517, No. 17, Mar. 12, 2009, pp. 5146-5150.

Gul S., et al., "Tin Oxide Thin Films Prepared by Sol-Gel for PV Applications," Materials Today: Proceedings, Dec. 4, 2015, vol. 2, No. 2, pp. 5793-5798.

Hwang Y.H., et al., "Ultraviolet Photo-annealing Process for Low Temperature Processed Sol-gel Zinc Tin Oxide Thin Film Transistors," Electrochemical and Solid-state Letters, 2012, vol. 15, No. 4, pp. H91-H93.

International Preliminary Report on Patentability for International Application No. PCT/US2023/011301, mailed Aug. 2, 2024, 8 pages.

International Preliminary Report on Patentability for International Application No. PCT/US2023/018758, mailed Oct. 31, 2024, 8 pages.

International Search Report and Written Opinion for International Application No. PCT/US2023/011301, mailed May 4, 2023, 10 pages.

International Search Report and Written Opinion for International Application No. PCT/US2023/018758, mailed Aug. 4, 2023, 10 pages.

Kim J.M., et al., "Holographic Optical Elements Recorded in Silver Halide Sensitized Gelatin Emulsions. Part I. Transmission Holographic Optical Elements," Applied Optics, 2001, vol. 40, No. 5, pp. 622-632, Retrieved from the Internet URL: https://opg.optica.org/ao/abstract.cfm?uri=ao-40-5-622.

Lodh S., et al., "Bandgap Engineering of Sol-Gel Spin-Coated TiO2 Thin Film on Glass Substrate," Photonics, Plasmonics and Information Optics, 2021, 18 pages, DOI: 10.1201/9781003047193-2.

Lu Y., et al., Modifying the Surface Properties of Superparamagnetic Iron Oxide Nanoparticles through a Sol-Gel Approach, Nano Letters, 2002, vol. 2, No. 3, pp. 183-186.

Marikkannan M., et al., "A Novel Synthesis of Tin Oxide Thin Films by the Sol-Gel Process for Optoelectronic Applications," AIP Advances, American Institute of Physics, Feb. 13, 2015, vol. 5, No. 2,8 pages.

Matthews P.D., et al., Structure, Photochemistry and Applications of Metal-Doped Polyoxotitanium Alkoxide Cages, Chemical Communications, Jul. 2014, vol. 50, pp. 12815-12823.

Neipp C., et al., "Optimization of Photopolymer Materials for the Fabrication of a Holographic Waveguide," Polymers, 2017, vol. 9, No. 9, 10 Pages, Retrieved from the Internet URL: https://www.mdpi.com/2073-4360/9/9/395.

Non-Final Office Action mailed Jan. 11, 2024 for U.S. Appl. No. 17/582,614, filed Jan. 24, 2022, 9 pages.

Notice of Allowance mailed May 2, 2024 for U.S. Appl. No. 17/582,614, filed Jan. 24, 2022, 7 pages.

Odinokov S.B., et al., "Augmented Reality Display Based on Photo-Thermo-Refractive Glass Planar Waveguide," Optics Express, Jun. 8, 2020, vol. 28, No. 12, pp. 17581-17594.

Prosposito P., et al., "UV-nanoimprinting Lithography of Bragg Gratings on Hybrid Sol-gel Based Channel Waveguides," Solid State Sciences, Nov. 2010, vol. 12, No. 11, pp. 1886-1889, Retrieved from the Internet URL: https://www.sciencedirect.com/science/article/abs/pii/S1293255810001287?via%3Dihub.

Rozes L., et al., Titanium Oxo-Clusters: Precursors for a Lego-Like Construction of Nanostructured Hybrid Materials, Chemical Society Reviews, 2011, vol. 40, pp. 1006-1030.

Sanctis S., et al., "Direct Photopatterning of Solutionprocessed Amorphous Indium Zinc Oxide and Zinc Tin Oxide Semiconductorsa Chimie Douce Molecular Precursor Approach to Thin Film Electronic Oxides," Advanced Materials Interfaces, 2018, vol. 5, No. 15, 8 Pages.

Sano K., et al., "Optically Transparent Colloidal Dispersion of TiO2 Nanoparticles Storable for longer than One year Prepared by Sol/Gel Progressive Hydrolysis/Condensation," ACS Applied Materials & Interfaces, 2020, 12(40), 13 pages.

Taherniya A., et al., Thickness Dependence of Structural, Optical and Morphological Properties of Sol-Gel Derived TiO2 Thin Film, Materials Research Express, 2019, vol. 6, 20 pages.

Tanski T., et al., "Influence of Calcination Temperature on Optical and Structural Properties of TiO2 Thin Films Prepared by Means of Sol-Gel and Spin Coating," Bulletin of the Polish Academy of Sciences Technical Sciences, 2018, vol. 66, No. 2, pp. 151-156.

Touam T., et al., "Sol-gel Glass Waveguides with Bragg Grating," Optical Engineering, Apr. 1, 1998, vol. 37, No. 4, 7 Pages, Retrieved from the Internet URL: https://www.spiedigitallibrary.org/journals/optical-engineering/volume-37/issue-4/0000/Sol-gel-glass-waveguides-with-Bragg-grating/10.1117/1.601947.short.

Wang N., et al., "Laterally-Driven Piezoelectric Bimorph Mems Actuator With Sol-Gel-Based High-Aspect-Ratio PZT Structure," IEEE 26th International Conference on Micro Electro Mechanical Systems (MEMS), 2013, pp. 197-200.

Yan L., et al., Porous TiO2 Conformal Coating on Carbon Nanotubes as Energy Storage Materials, Electrochimica Acta, 2015, vol. 169, pp. 73-81.

Zhang N., et al., "Improved Holographic Waveguide Display System," Applied Optics, Apr. 20, 2015, vol. 54, No. 12, pp. 3645-3649.

* cited by examiner

| Example | Component 1 | Component 1 conc. | Dilution | Coating | Temperature | Thickness (nm) | RI@520 nm | Gap Fill |
|---|---|---|---|---|---|---|---|---|
| 1 | $TiCl_4$ | 10% | DPGME | 1000 rpm | 150 °C | 99.7 | 1.64 | NO |
| 2 | $HfCl_4$ | | | | | 71.1 | 1.57 | NO |
| 3 | $NbCl_5$ | | | | | 84.2 | 1.72 | NO |

| Example | Component 1 | Component 1 conc. | Dilution | Temperature | Thickness (nm) | RI@520 nm | Abs % @460 nm | Gap Fill |
|---|---|---|---|---|---|---|---|---|
| 4 | $SnCl_2$ | 10% | DPGME | 80 °C | 258.74 | 1.59 | -0.01 / -0.04 | YES |
| 5 | | | | 100 °C | 129.45 | 1.73 | 0.02 / 0.02 | YES |
| 6 | | | | 115 °C | 102.53 | 1.83 | 0.01 / 0.01 | YES |
| 7 | | | | 130 °C | 75.4 | 1.95 | 0.02 / 0.00 | YES |
| 8 | | | | 150 °C | 59.81 | 2.00 | 0.03 / 0.04 | YES |
| 9 | | | | 185 °C | 54.65 | 2.12 | 0.06 / 0.07 | YES |
| 10 | | | | 200 °C | 53.45 | 2.12 | 0.04 / 0.05 | YES |

FIG. 10A

| Example | Component 1 | Component 1 conc. | Dilution | Temperature | Amorphous Fraction (%) | Sn atomic composition (%) | Sn(IV):Sn(II) ratio |
|---|---|---|---|---|---|---|---|
| 11 | $SnCl_2$ | 10% | DPGME | 150 °C | 100 | 32.1 | 1:1 |
| 12 | | | | 185 °C | 100 | 34 | 3:1 |

FIG. 11

| Example | Component 1 | Component 1 conc. | Dilution | Temperature | RI@520 nm | Gap Fill |
|---|---|---|---|---|---|---|
| 13 | $SnCl_2$ | 10.00% | IPA | 200 °C | 1.65 | YES |
| 14 | | | DEG | | 1.98 | YES |
| 15 | | | PGME | | 1.80 | YES |
| 16 | | | DPGBE | | 1.91 | NO |
| 17 | | | DEGMEE | | 2.34 | NO |

FIG. 12A

| Example | Component 1 | Component 1 conc. | Dilution | Coating | Temperature | Thickness (nm) | RI@520 nm | Abs % @460 nm | Gap Fill |
|---|---|---|---|---|---|---|---|---|---|
| 18 | $SnCl_2$ | 10% | PGME | 1000 rpm | 120 °C | 129.4 | 1.63 | 0.02 | YES |
| 19 | | | | | 250 °C | 84.6 | 1.80 | 0.05 | YES |
| 20 | | | | | 120 °C + 250 °C | 82.1 | 1.67 | 0.03 | YES |

FIG. 13

| Example | Component 1 | Component 1 conc. | Component 2 | Component 2 conc. | Dilution | Coating | Temperature | RI@520 nm | Abs % @460 nm | Gap Fill |
|---|---|---|---|---|---|---|---|---|---|---|
| 21 | $SnCl_2$ | 10% | Ethanolamine | 1% | DPGME | 1000 rpm | 150 °C | 1.98 | 0.03 | YES |
| 22 | | | | | | | 200 °C | 2.09 | 0.01 | YES |

FIG. 14

MIXED VALENCE SOL-GELS FOR HIGH REFRACTIVE INDEX, TRANSPARENT OPTICAL COATINGS

RELATED APPLICATIONS

This application is a continuation of U.S. application Ser. No. 18/147,686, filed Dec. 28, 2022, which claims the benefit of U.S. Provisional Application No. 63/301,850, filed Jan. 21, 2022, the disclosures of each of which are incorporated, in their entirety, by this reference.

BACKGROUND

Sol-gels are materials composed of a solution comprising a metal oxide precursor that may have been partially or fully condensed into an extended network. Upon coating the solution and thermal annealing of the sol-gel, the precursor ligands and solvent may be thermally removed to fully condense the extended network into an oxide or inorganic film. The condensation process may result in densification and, potentially, crystallization. Thus, when applied onto a substrate and annealed, sol-gels can be used to manufacture transparent, high refractive-index (RI) coatings.

SUMMARY

This disclosure relates generally to a sol-gel material (e.g., a sol-gel overcoating mixture). More specifically, techniques disclosed herein relate to sol-gel materials that may include at least one metal halide precursor and at least one alcohol. After being annealed, the metal in the metal halide may be in at least 2 oxidation states, both of which are stable and transparent. By producing a mixture of the same metal in multiple oxidation states, as well as a mixture of oxo and chloride ligands, which are all transparent to visible light, an amorphous state of the sol-gel material without any noticeable domain formation that would otherwise distribute stress or shrink locally and lead to voiding inside nano-gratings to be overcoated may be obtained. As such, highly condensed states of the sol-gel with RI values in the range of about 1.7 to about 2.2 may be achieved, without sacrificing recessed-feature fill.

In one embodiment, a tin(II) precursor containing halide ligands is dissolved in an alcohol or glycol. Upon coating and annealing, the tin(II) mixture is partially oxidized to tin(IV). Both tin(II) and tin(IV) oxides or oxyhalides are transparent to visible light, and mixtures of the two oxidation states are also transparent. Furthermore, the mixture of tin(II) and tin(IV) oxides or oxyhalides can be condensed to produce coatings with RI values between about 1.7 and about 2.2 when they are in amorphous states after being annealed, and will not form discrete domains, regardless of the level of condensation. The tin(II):tin(IV) ratio may be maintained in the range of about 1:5 to about 4:1 in order to realize RI values in the range of about 1.7 to about 2.2, without leading to loss of recessed-feature filling capabilities (e.g., fill the recess features of a substrate void-free). Advantageously, the condensation process for the sol-gel material (e.g., the tin(II)/tin(IV) mixture) can be conducted at temperatures less than about 300° C.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 10A shows material compositions and performance of working examples 4-10 according to certain embodiments.

FIG. 11 shows material compositions and performance of working examples 11-12 according to certain embodiments.

FIG. 12A shows material compositions and performance of working examples 13-17 according to certain embodiments.

FIG. 13 shows material compositions and performance of working examples 18-20 according to certain embodiments.

FIG. 14 shows material compositions and performance of working examples 21-22 according to certain embodiments.

Figure 1:
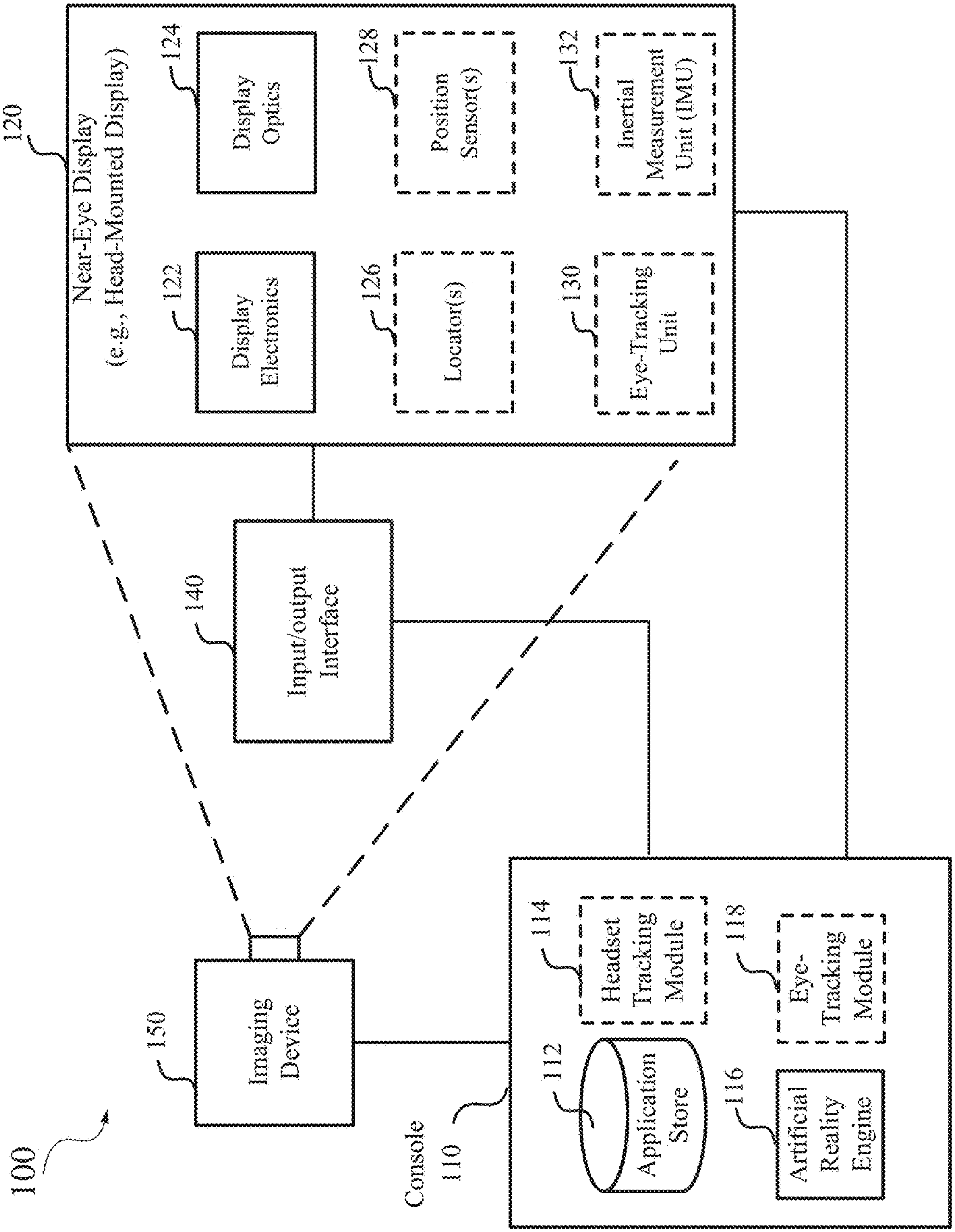
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to sol-gel overcoating materials. More specifically, techniques disclosed herein relate to sol-gel materials including a mixture of a same metal in multiple oxidation states (e.g., tin(II) and tin(IV)), where all the oxidation states are transparent, and the sol-gel materials may stay in an amorphous state without any noticeable domain formation. When used for optical coating, the sol-gel materials may achieve highly condensed states with RI values in a range of about 1.7-2.2 without sacrificing recessed-feature fill. Various inventive embodiments are described herein, including devices, systems, methods, materials, processes, compositions, and the like.

An artificial reality system, such as a head-mounted display (HMD) or heads-up display (HUD) system, generally includes a near-eye display configured to present content to a user via an electronic or optic display that is within, for example, about 10-20 mm in front of the user's eyes. The near-eye display may be in the form of, for example, a headset or a pair of glasses. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide through total internal reflection, and be coupled out of the waveguide at multiple locations towards a user's eye. In some implementations, the light of the projected images may be coupled into or out of the waveguide using diffractive optical elements, such as gratings, which may be transparent to ambient light and thus may allow light from the surrounding environment to pass through a see-through region of the waveguide to reach the user's eye without being diffracted. In some implementations, a surface-relief grating that includes surface-relief structures formed in a substrate or a material layer deposited on a substrate may be used to couple light into or out of a waveguide. An overcoat layer with a refractive index different from the refractive index of the surface-relief structures may be formed on the surface-relief grating to fill gaps in the surface-relief structures and mediate optical properties of the surface-relief structures. The overcoat layer may need to be superconformal to the surfaces of the surface-relief structures, have no voids or air bubbles, have a refractive index much higher or lower than the refractive index of the surface-relief structures, and have low absorption to visible light. The overcoat layer may include dielectric materials, such as Hafnia, Titania, Tantalum oxide, Tungsten oxide, Zirconium oxide, Gallium sulfide, Gallium nitride, Gallium phosphide, silicon, or high refractive index organic materials (e.g., resins).

According to certain embodiments, sol-gels may be used to form the overcoat layer on the surface-relief grating. Sol-gels are materials that may include a solution comprising an oxide precursor and may have been partially or fully condensed into an extended network. Upon coating and thermal annealing of the sol-gel, the precursor ligands and solvent may be removed to fully condense the extended network into an oxide or inorganic film. The condensation process may result in densification, and, in some circumstances, crystallization. Thus, when applied onto a substrate and annealed, sol-gels can be used to manufacture high refractive-index (RI) coatings. Sol-gels can be dispensed as solutions, and thus may offer improved processability as compared to high RI nanocomposites, which may have higher viscosity and decreased material flow. Furthermore, since sol-gels do not need the incorporation of a resin matrix, and since annealing can drive all organic and solvent components out of the oxide or inorganic network, sol-gels may also offer the advantages of high RI coatings with improved transparency to visible light, as compared to nanocomposites that include high RI nanoparticles dispersed in a resin, the transparency of which may degrade over time. However, for sol-gels to be applied as coatings for optical gratings, it is desirable that the coating penetrates recessed features (gratings, trenches, vias & through-holes) and retains a flat surface on the top of the coating. In other words, the coating needs to achieve superconformal feature fill. While the sol-gel might fill these features prior to annealing and densification, it is found that densification of typical oxides to yield RI values larger than about 1.7 usually leads to voiding inside nano-gratings with feature widths of 5-200 nm and aspect ratios (width to depth) of about 1:1.5 to about 1:50.

Voiding may occur when shrinking stress is not evenly distributed across the whole film during condensation, or when the stress is not exerted unidirectionally to prevent pull-out from the nanograting. It is found that stress is distributed locally within domains or grains inside the nanograting, such that voiding may occur around these domains as the maternal shrinks. Thus, in order to avoid domain or grain formation, or to allow shrinking stress to be distributed globally across sol-gel coating, it is desirable to retain a continuous material network. This may be achieved by retaining the sol-gel material in an amorphous state. However, in most cases, it is unlikely to condense the material to achieve an RI higher than 1.7 without forming discrete domains within the sol-gel or inducing some level of crystallization. Furthermore, it is desirable to fill the recess feature in a void-free fashion without having to increase the content of organics in the sol-gel content. Surfactants and support organic resins could be mixed into the sol-gel such that the feature penetration and fill-retention during shrinkage is improved and discrete particle formation is avoided. However, increasing organics content in the coating typically lowers the coating's transparency or introduces potential reliability issues. Thus, a new class of sol-gel material is needed where the sol-gel material can achieve a high RI (e.g., about 1.7-2.2) and a void-free superconformal fill of recessed features after annealing (e.g., after being cured). In addition, to increase the compatibility and utility of sol-gel materials in industrial manufacturing processes, there is a need for sol-gel materials that can be condensed to achieve high RI values at an annealing temperature less than about 300° C.

Sol-gel coatings are typically used to form a conformal coating that tracks the topography of an underlying substrate without recessed features. In most of these applications, the sol-gel coating only varies in 2 dimensions, but the thickness (the third dimension) is constant (see, e.g., Barhoum et al., Chem. Mater. 2011, 23, 23, 5177-5184; Yan et al., Electrochimica Acta 2015, 169, 73-81; and Lu et al., Nano Letters 2002, 2, 3, 183-186). While the shape of the substrate can be complex (i.e. flat, bent, tubular, etc.), the substrate typically does not contain recessed features at the nanometer scale. In the event that the substrate has high aspect ratio nano- to micro-sized recessed features, it is expected that the sol-gel will trace the outline of the features and form a conformal coating. If the film thickness is greater than the depth of the recessed features, it is possible to fill the high aspect ratio features with the non-annealed film. Nevertheless, upon annealing, the sol-gel material inside the high aspect ratio nano- to micro-sized recessed features may shrink and collapse into particulates and create holes or voids. As a result, sol-gels are not typically used for superconformal coatings of high aspect ratio recessed features. In this disclosure, sol-gel materials that can superconformally fill in the high aspect ratio recessed features while resulting in a flat surface on the top of the sol-gel coating are disclosed.

The annealing temperature for full densification of the sol-gel coating generally depends on the chemical nature of the precursor used and the structure of the target oxide, but the anneal temperature is typically higher than about 500° C. For example, full densification for $TiO_2$ films made from monomeric precursors is observed at about 600° C. (see Taherniya et al., Mater. Res. Express 2019, 6, 016417; and Tanski et al., BULLETIN OF THE POLISH ACADEMY OF SCIENCES TECHNICAL SCIENCES, Vol. 66, No. 2, 2018, DOI: 10.24425/119069). The annealing process is used to maximize RI and tune film transparency (see Blanco et al., Applied Surface Science 2018, 439, 736-748; and Gareso et al., 2019 *J. Phys.: Conf. Ser.* 1242 012037). In many cases, the shrinkage from the initial coating to the fully annealed film is higher than 60%, and typically around 90% (sec Lodh & Chakraborty, Bandgap Engineering of Sol-Gel Spin-Coated $TiO_2$ Thin Film on Glass Substrate. 2021, DOI: 10.1201/9781003047193-2). Thus, films made from sol-gels may have high thickness variations during annealing, and their application to fill recessed features may be accompanied by feature voiding due to shrinkage.

Sol-gels containing multicore precursors or pre-condensed gels can be used to lower the shrinkage of the film between coating and full annealing. However, the composition of these materials is typically unstable and tends to form nanoparticles in solution over time (see Sano et al., *ACS Appl. Mater. Interfaces* 2020, 12, 40, 44743-44753). Furthermore, molecular oxide clusters tend to be unstable towards water and molecular oxygen, or they tend to aggregate over time (sec Matthews et al., Chem. Commun. 2014, 50, 12815-12823; Coppens et al., Chem. Rev. 2014, 114, 9645-9661; and Rozes et al., Chem. Soc. Rev. 2011, 40, 1006-1030). Once aggregates and nanoparticles are formed, a quality superconformal fill of recessed features may not be achieved in the absence of a support resin. Thus, the applicability of polyoxo clusters in industrial applications may be severely hampered.

A titanium oxysulfate-based sol-gel may be used to achieve and retain recessed feature fill throughout the sol-gel annealing process. The sulfate ion may prevent the material from forming particles during the condensation process and thus voiding may be prevented. However, the titanium oxysulfate-based sol-gel may only allow for optical films with a maximum RI of about 1.95. For example, when Titanium oxysulfate is used as the sole precursor in the sol-gel, the maximum RI of the resultant coating is about 1.81. The RI could be increased further by mixing a titanium oxysulfate precursor with a secondary oxytitanyl species or a pre-condensed network from a titanium tetrachloride precursor. The mixing ratio between the titanium oxysulfate and the second Titanium species may determine the balance between the optical performance and recessed feature-fill capabilities. However, it may be difficult to increase the RI above 1.95 without leading to loss of recess-fill capabilities. This is because, at higher ratios of the second oxytitanyl or the titanium tetrachloride precursor, early particle formation and voiding during shrinkage may not be prevented.

Recessed-feature fill with an RI up to 2.0 may be possible with a dual component Titanium system annealed at temperatures of no higher than 500° C. This may be achieved by delaying domain or grain formation until the very last stages of condensation, such that, if any local shrinkage takes place, it leads to no noticeable voiding. However, this performance may not be extended to coatings with an RI higher than 2.0, and processing temperatures lower than 300° C. may only produce coating with RI lower than 1.9.

Therefore, there is a need for sol-gel materials that can be used to create coating with superconformal fill of recessed features, where the feature widths are about 5-200 nm and aspect ratios are about 1:1.5 to 1:50 width to depth, and where the RI of the sol-gel is between about 1.7-2.2 when processing the sol-gel at temperatures lower than about 300° C.

The technical solutions disclosed herein provides sol-gel materials that after annealing, could form a coating layer with high RI (e.g., between about 1.7-2.2) and could superconformally fill the nano- to micro-sized surface-relief structure on a surface. In some embodiments, the sol-gel materials may include at least one metal halide precursor and at least one alcohol. After being annealed, the metal in the metal halide may be in at least 2 oxidation states, both of which are stable and transparent. By producing a mixture of the same metal in multiple oxidation states, as well as a mixture of oxo and chloride ligands, which are all transparent to visible light, an amorphous state of the sol-gel material without any noticeable domain formation that would otherwise distribute stress or shrink locally and lead to voiding inside nano-gratings to be overcoated may be obtained. As such, highly condensed states of the sol-gel with RI values in the range of about 1.7 to about 2.2 may be achieved, without sacrificing recessed-feature fill.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, or sound) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, or aperture).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to determine the eye's orientation more accurately.

Figure 2:
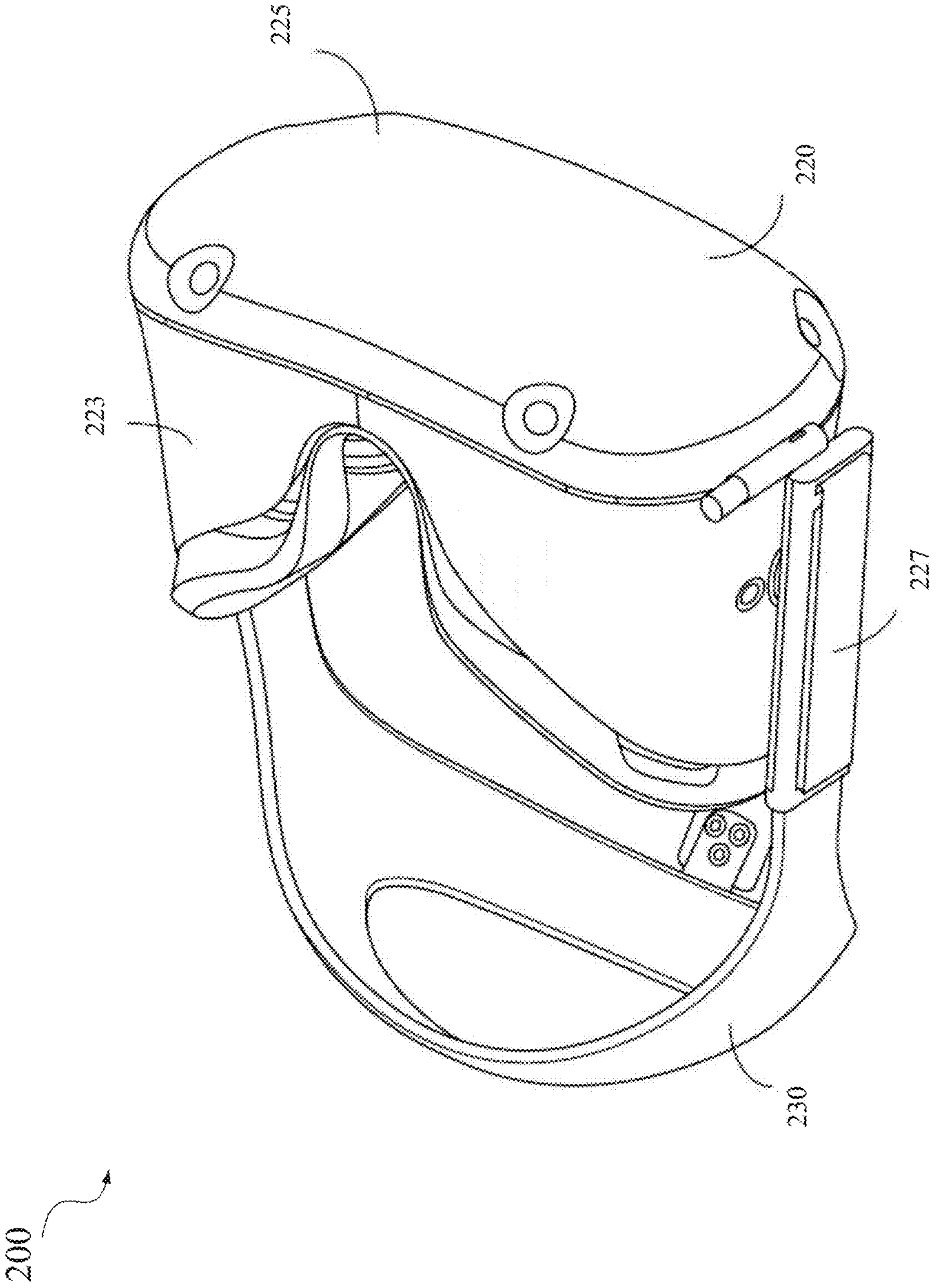
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
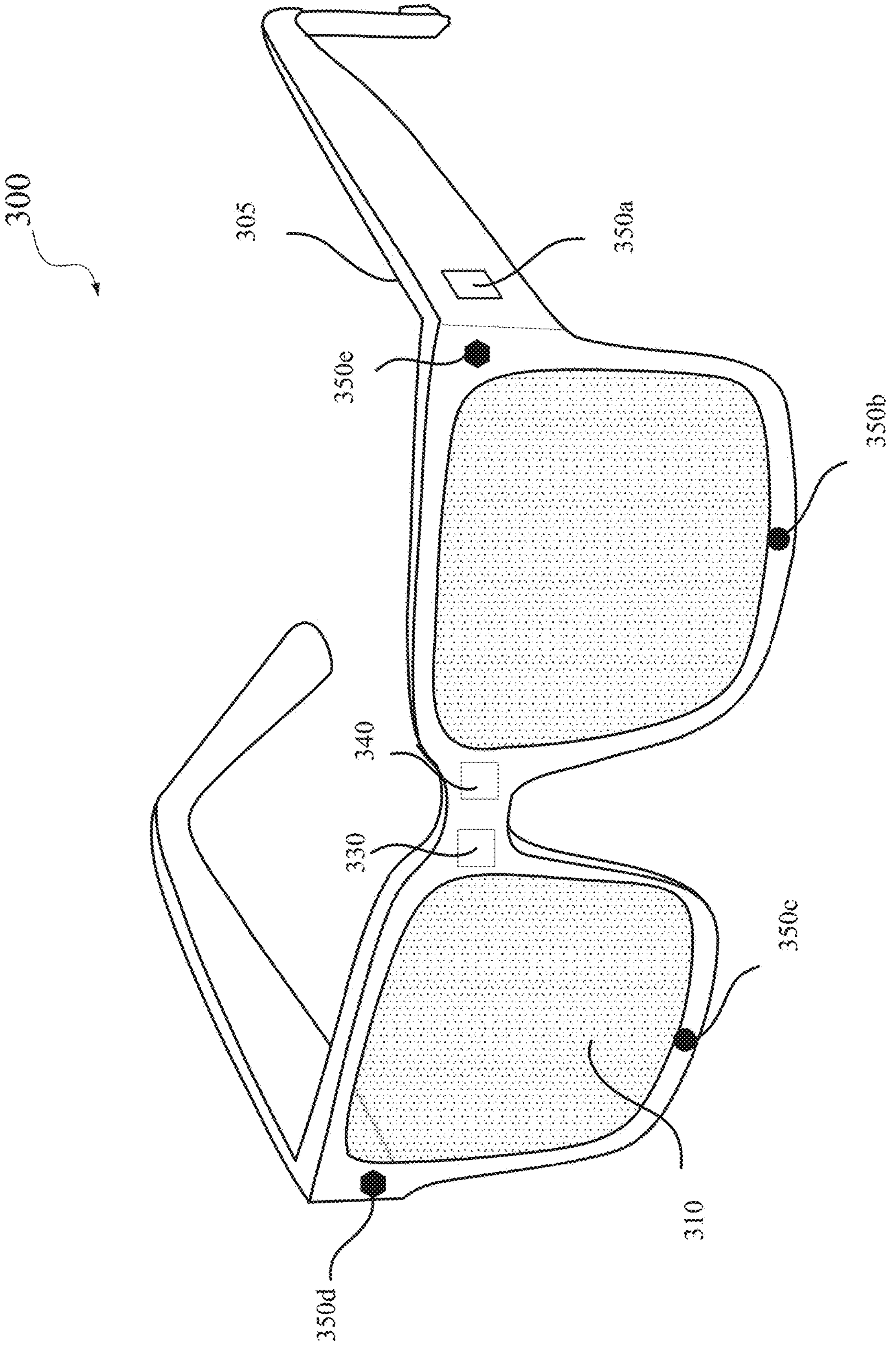
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350*a*, 350*b*, 350*c*, 350*d*, and 350*e* on or within frame 305. In some embodiments, sensors 350*a*-350*e* may include one or more depth sensors, motion sensors, position sensors, inertial sensors, or ambient light sensors. In some embodiments, sensors 350*a*-350*e* may include one or more image sensors configured to generate image data representing different fields of views in different directions. In some embodiments, sensors 350*a*-350*e* may be used as input devices to control or influence the displayed content of near-eye display 300, and/or to provide an interactive VR/AR/MR experience to a user of near-eye display 300. In some embodiments, sensors 350*a*-350*e* may also be used for stereoscopic imaging.

In some embodiments, near-eye display 300 may further include one or more illuminators 330 to project light into the physical environment. The projected light may be associated with different frequency bands (e.g., visible light, infra-red light, or ultra-violet light), and may serve various purposes. For example, illuminator(s) 330 may project light in a dark environment (or in an environment with low intensity of infra-red light, ultra-violet light, etc.) to assist sensors 350*a*-350*e* in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
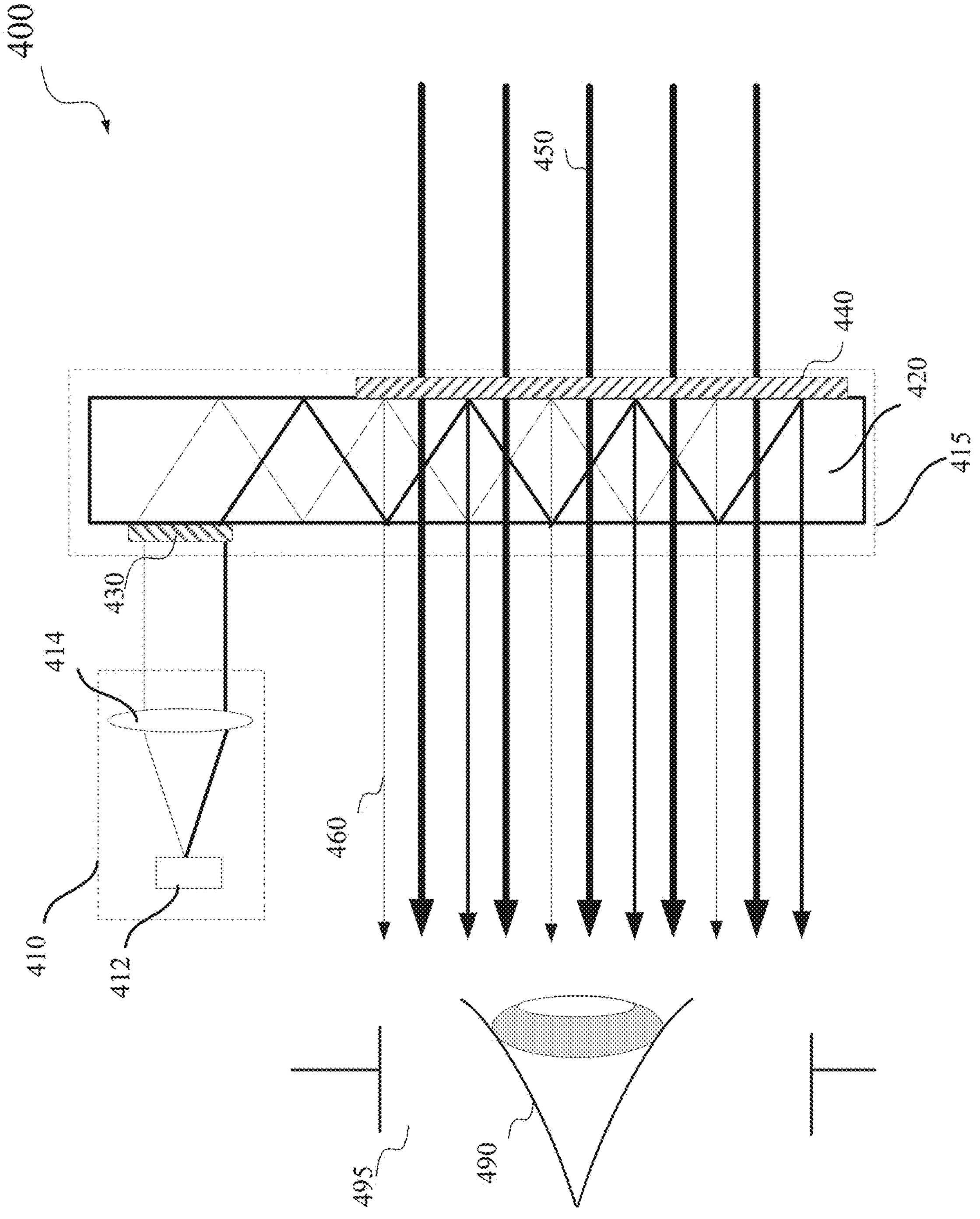
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit light in a first wavelength range such as visible light from about 400 nm to about 650 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric or semiconductor materials, such as glass, quartz, plastic, polymer, poly(methyl methacrylate) (PMMA), crystal, silicon, SiN, silicon carbide, ceramic, or the like. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements, or prisms. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

Figure 5B:
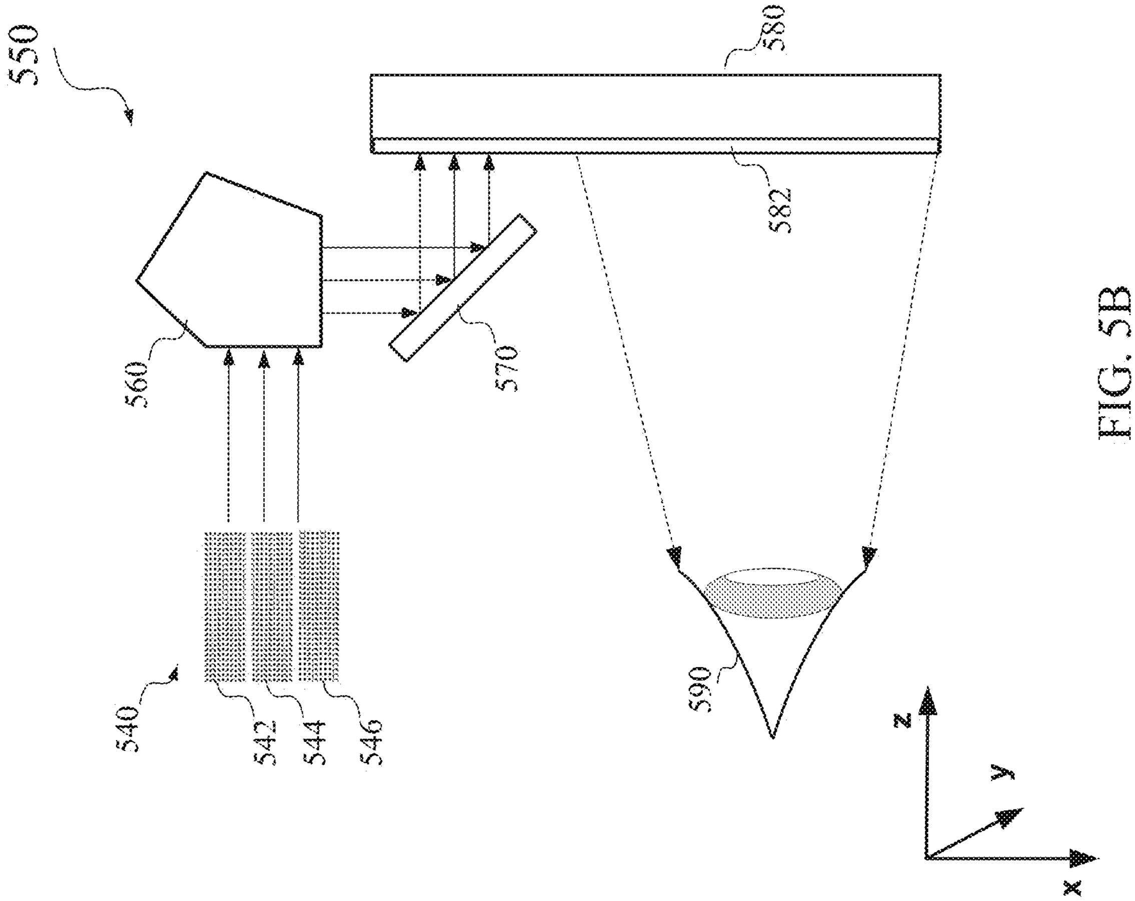
FIG. 5B illustrates an example of a near-eye display device including a waveguide display according to certain embodiments.
Figure 5A:
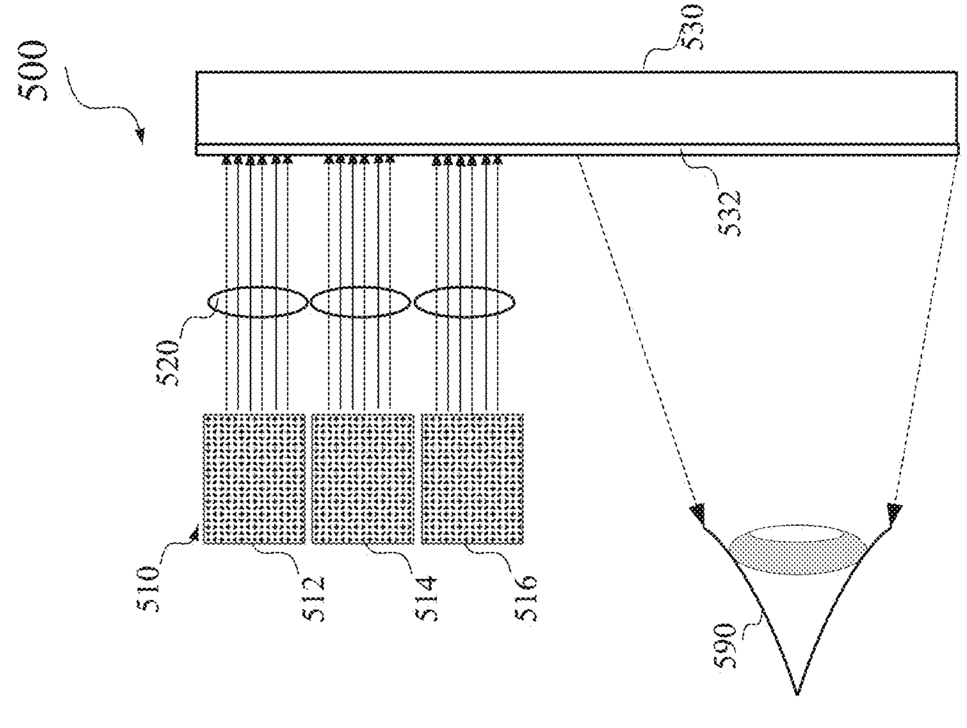
FIG. 5A illustrates an example of a near-eye display device including a waveguide display according to certain embodiments.

FIG. 5A illustrates an example of a near-eye display (NED) device 500 including a waveguide display 530 according to certain embodiments. NED device 500 may be an example of near-eye display 120, augmented reality system 400, or another type of display device. NED device 500 may include a light source 510, projection optics 520, and waveguide display 530. Light source 510 may include multiple panels of light emitters for different colors, such as a panel of red light emitters 512, a panel of green light emitters 514, and a panel of blue light emitters 516. The red light emitters 512 are organized into an array; the green light emitters 514 are organized into an array; and the blue light emitters 516 are organized into an array. The dimensions and pitches of light emitters in light source 510 may be small. For example, each light emitter may have a diameter less than 2 μm (e.g., about 1.2 μm) and the pitch may be less than 2 μm (e.g., about 1.5 μm). As such, the number of light emitters in each red light emitters 512, green light emitters 514, and blue light emitters 516 can be equal to or greater than the number of pixels in a display image, such as 960×720, 1280×720, 1440×1080, 1920×1080, 2160×1080, or 2560×1080 pixels. Thus, a display image may be generated simultaneously by light source 510. A scanning element may not be used in NED device 500.

Before reaching waveguide display 530, the light emitted by light source 510 may be conditioned by projection optics 520, which may include a lens array. Projection optics 520 may collimate or focus the light emitted by light source 510 to waveguide display 530, which may include a coupler 532 for coupling the light emitted by light source 510 into waveguide display 530. The light coupled into waveguide display 530 may propagate within waveguide display 530 through, for example, total internal reflection as described above with respect to FIG. 4. Coupler 532 may also couple portions of the light propagating within waveguide display 530 out of waveguide display 530 and towards user's eye 590.

FIG. 5B illustrates an example of a near-eye display (NED) device 550 including a waveguide display 580 according to certain embodiments. In some embodiments, NED device 550 may use a scanning mirror 570 to project light from a light source 540 to an image field where a user's eye 590 may be located. NED device 550 may be an example of near-eye display 120, augmented reality system 400, or another type of display device. Light source 540 may include one or more rows or one or more columns of light emitters of different colors, such as multiple rows of red light emitters 542, multiple rows of green light emitters 544, and multiple rows of blue light emitters 546. For example, red light emitters 542, green light emitters 544, and blue light emitters 546 may each include N rows, each row including, for example, 2560 light emitters (pixels). The red light emitters 542 are organized into an array; the green light emitters 544 are organized into an array; and the blue light emitters 546 are organized into an array. In some embodiments, light source 540 may include a single line of light emitters for each color. In some embodiments, light source 540 may include multiple columns of light emitters for each of red, green, and blue colors, where each column may include, for example, 1080 light emitters. In some embodiments, the dimensions and/or pitches of the light emitters in light source 540 may be relatively large (e.g., about 3-5 μm) and thus light source 540 may not include sufficient light emitters for simultaneously generating a full display image. For example, the number of light emitters for a single color may be fewer than the number of pixels (e.g., 2560×1080 pixels) in a display image. The light emitted by light source 540 may be a set of collimated or diverging beams of light.

Before reaching scanning mirror 570, the light emitted by light source 540 may be conditioned by various optical devices, such as collimating lenses or a freeform optical element 560. Freeform optical element 560 may include, for example, a multi-facet prism or another light folding element that may direct the light emitted by light source 540 towards scanning mirror 570, such as changing the propagation direction of the light emitted by light source 540 by, for example, about 90° or larger. In some embodiments, freeform optical element 560 may be rotatable to scan the light. Scanning mirror 570 and/or freeform optical element 560 may reflect and project the light emitted by light source 540 to waveguide display 580, which may include a coupler 582 for coupling the light emitted by light source 540 into waveguide display 580. The light coupled into waveguide display 580 may propagate within waveguide display 580 through, for example, total internal reflection as described above with respect to FIG. 4. Coupler 582 may also couple portions of the light propagating within waveguide display 580 out of waveguide display 580 and towards user's eye 590.

Scanning mirror 570 may include a microelectromechanical system (MEMS) mirror or any other suitable mirrors. Scanning mirror 570 may rotate to scan in one or two dimensions. As scanning mirror 570 rotates, the light emitted by light source 540 may be directed to a different area of waveguide display 580 such that a full display image may be projected onto waveguide display 580 and directed to user's eye 590 by waveguide display 580 in each scanning cycle. For example, in embodiments where light source 540 includes light emitters for all pixels in one or more rows or columns, scanning mirror 570 may be rotated in the column or row direction (e.g., x or y direction) to scan an image. In embodiments where light source 540 includes light emitters for some but not all pixels in one or more rows or columns, scanning mirror 570 may be rotated in both the row and column directions (e.g., both x and y directions) to project a display image (e.g., using a raster-type scanning pattern).

NED device 550 may operate in predefined display periods. A display period (e.g., display cycle) may refer to a duration of time in which a full image is scanned or projected. For example, a display period may be a reciprocal of the desired frame rate. In NED device 550 that includes scanning mirror 570, the display period may also be referred to as a scanning period or scanning cycle. The light generation by light source 540 may be synchronized with the rotation of scanning mirror 570. For example, each scanning cycle may include multiple scanning steps, where light source 540 may generate a different light pattern in each respective scanning step.

In each scanning cycle, as scanning mirror 570 rotates, a display image may be projected onto waveguide display 580 and user's eye 590. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 570 may revert back to the initial position to project light for the first few rows of the next display image or may rotate in a reverse direction or scan pattern to project light for the next display image, where a new set of driving signals may be fed to light source 540. The same process may be repeated as scanning mirror 570 rotates in each scanning cycle. As such, different images may be projected to user's eye 590 in different scanning cycles.

Figure 6:
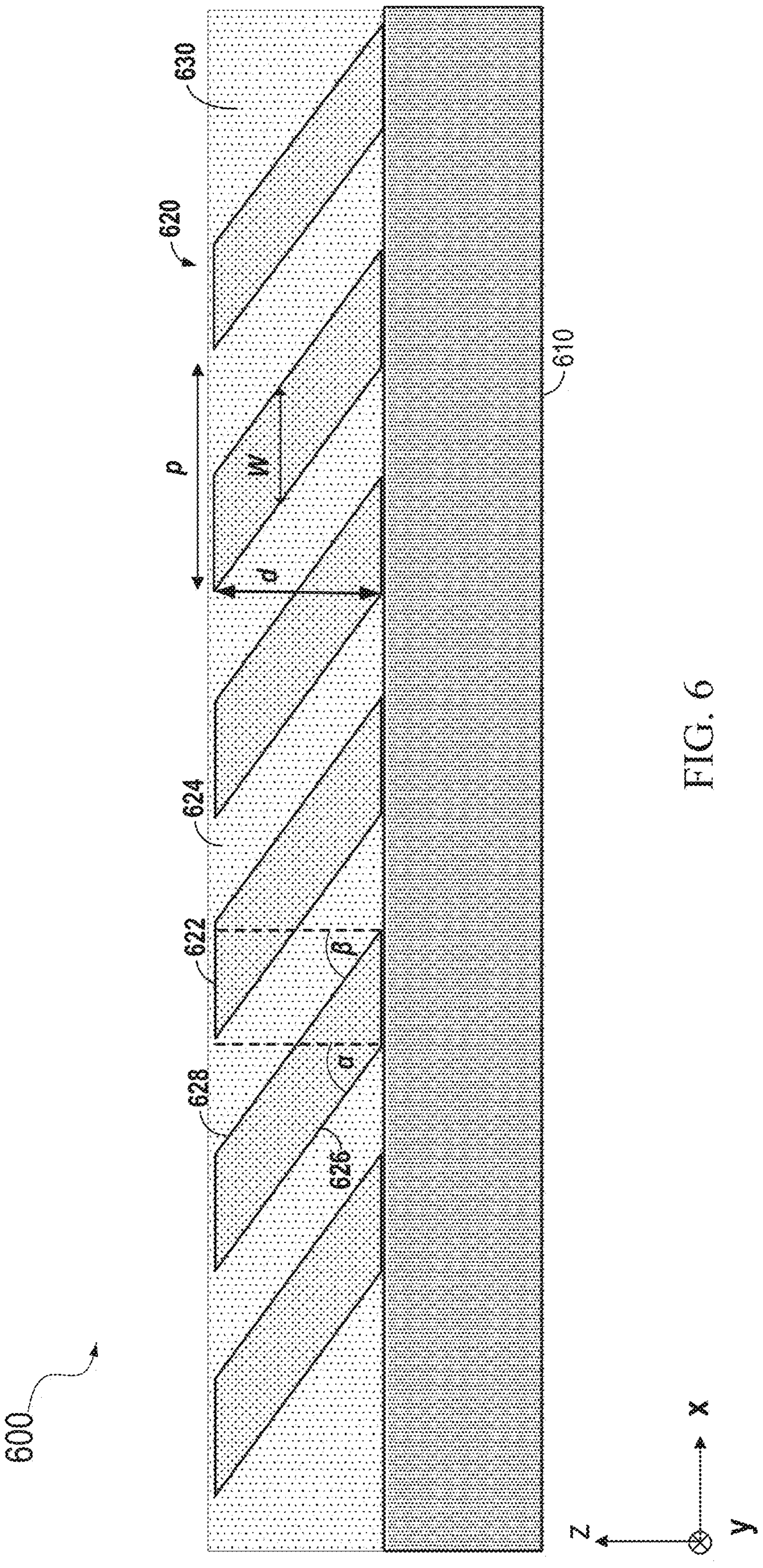
FIG. 6 illustrates an example of a slanted grating in a waveguide display according to certain embodiments.

FIG. 6 illustrates an example of a slanted grating 620 in a waveguide display 600 according to certain embodiments. Slanted grating 620 may be an example of input coupler 430, output couplers 440, coupler 532, or coupler 582. Slanted grating 620 may be formed on a waveguide 610, such as substrate 420. Slanted grating 620 may act as a grating coupler for couple light into or out of waveguide 610. In some embodiments, slanted grating 620 may include a one-dimensional periodic structure with a period p. For example, slanted grating 620 may include a plurality of ridges 622 and grooves 624 between ridges 622. Each period of slanted grating 620 may include a ridge 622 and a groove 624, which may be an air gap or a region filled with a material with a refractive index $n_{g2}$. The ratio between the width d of a ridge 622 and the grating period p may be referred to as duty cycle. Slanted grating 620 may have a duty cycle ranging, for example, from about 10% to about 90% or greater. In some embodiments, the duty cycle may vary from period to period. In some embodiments, the period p of the slanted grating may vary from one area to another on slanted grating 620, or may vary from one period to another (i.e., chirped) on slanted grating 620. In some embodiments, the heights of ridges 622 or the depths of grooves 624 may vary from one area to another on slanted grating 620, or may vary from one period to another on slanted grating 620. In some embodiments, slanted grating 620 may include a two-dimensional grating. In some embodiments, the period p, the duty cycle, the heights of ridges 622, and/or the depths of grooves 624 of slanted grating 620 may vary along the x direction, the y direction, or both.

Ridges 622 may be made of a material with a refractive index of $n_{g1}$, such as silicon containing materials (e.g., $SiO_2$, $Si_3N_4$, SiC, $SiO_xN_y$, or amorphous silicon), organic materials (e.g., spin on carbon (SOC) or amorphous carbon layer (ACL) or diamond like carbon (DLC)), or inorganic metal oxide layers (e.g., $TiO_x$, $AlO_x$, $TaO_x$, or $HfO_x$). Each ridge 622 may include a leading edge 626 with a slant angel α and a trailing edge 628 with a slant angle β. In some embodiments, leading edge 626 and training edge 628 of each ridge 622 may be parallel to each other. In other words, slant angle α is approximately equal to slant angle β. In some embodiments, slant angle α may be different from slant angle β. In some embodiments, slant angle α may be approximately equal to slant angle βB. For example, the difference between slant angle α and slant angle β may be less than 20%, 10%, 5%, 1%, or less. In some embodiments, slant angle α and slant angle β may range from, for example, about 30° or less to about 60% or larger.

In some implementations, grooves 624 between the ridges 622 may be over-coated or filled with an overcoat layer 630. Overcoat layer 630 may include a material having a refractive index $n_{g2}$ higher or lower than the refractive index of the material of ridges 622. For example, in some embodiments, a high refractive index material, such as Hafnia, Titania, Tantalum oxide, Tungsten oxide, Zirconium oxide, Gallium sulfide, Gallium nitride, Gallium phosphide, silicon, sol-gels, a high refractive index polymer, or a combination thereof, may be used to fill grooves 624. In some embodiments, a low refractive index material, such as silicon oxide, alumina, porous silica, or fluorinated low index monomer (or polymer), may be used to fill grooves 624. As a result, the difference between the refractive index of the ridges and the refractive index of the grooves may be greater than 0.1, 0.2, 0.3, 0.5, 1.0, or higher. In some embodiments, the top surface of overcoat layer 630 may align with the top surfaces of ridges 622. In some embodiments, the top surface of overcoat layer 630 may be above the top surfaces of ridges 622.

In some embodiments, sol-gels may be used to form the overcoat layer on the surface-relief grating. Sol-gels are materials that may include a solution comprising an oxide precursor that may have been partially or fully condensed into an extended network. Upon coating and thermal annealing of the sol-gel, the precursor ligands and solvent may be removed to fully condensed the extended network into an oxide film. The condensation process may result in densification, and, in some circumstances, crystallization. Thus, when applied onto a substrate and annealed, sol-gels can be used to manufacture high refractive-index (RI) coatings. Sol-gels can be dispensed as solutions, and thus may offer improved processability as compared to high RI nanocomposites, which have higher viscosity and decreased material flow. Furthermore, since sol-gels do not need the incorporation of a resin matrix, and since annealing can drive all organic and solvent components out of the oxide network, sol-gels may also offer the advantages of high RI coatings with markedly improved transparency to visible light, as compared to nanocomposites that include high RI nanoparticles dispersed in a resin, the transparency of which may degrade over time.

Figure 7A:
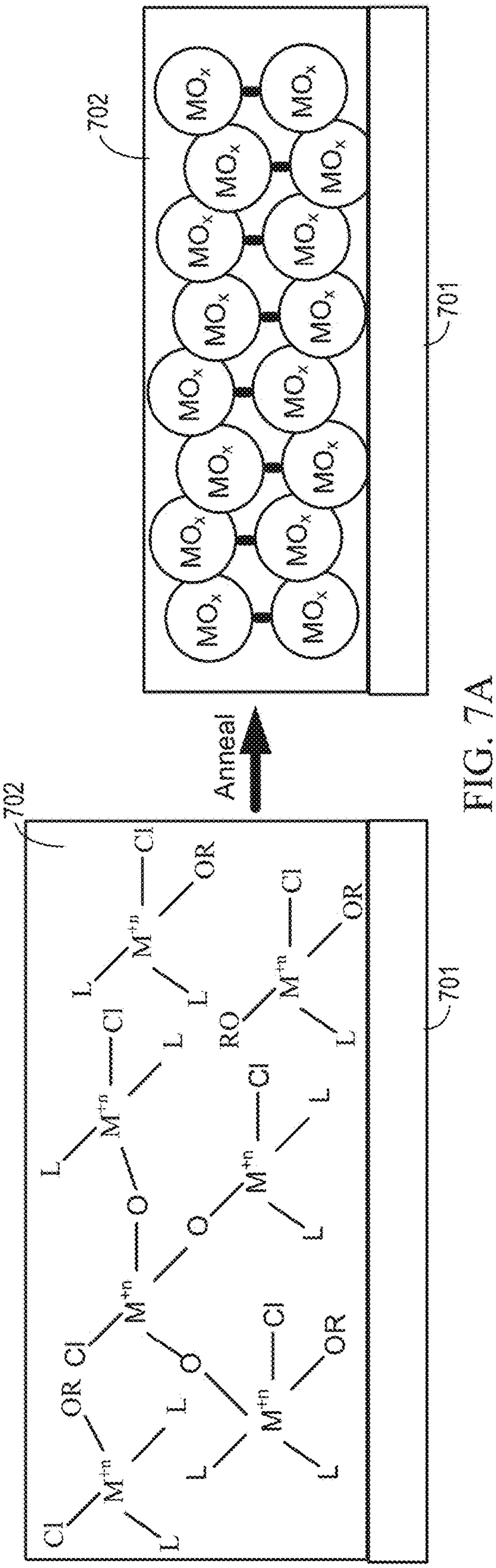
FIG. 7A illustrates an example of a sol-gel coating layer on a flat substrate before and after annealing, where the sol-gel coating layer may condense and shrink during and after the annealing, leading to the formation of domains or grains.
Figure 7B:
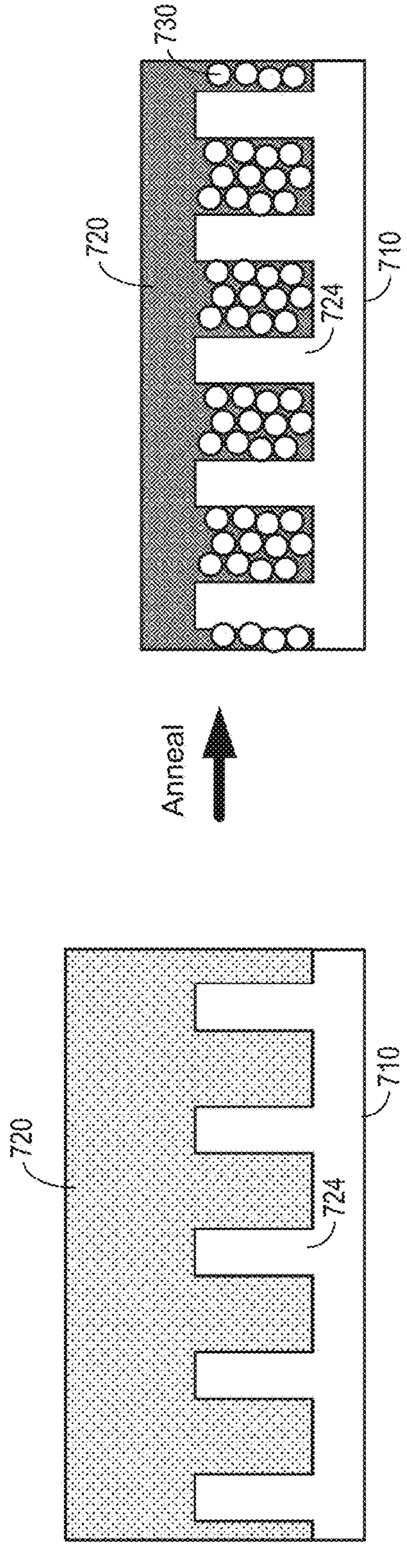
FIG. 7B illustrates a substrate including recessed features and a sol-gel coating layer on the recessed features before and after annealing, wherein the domain formation leads to voiding inside the recessed features.

FIGS. 7A and 7B illustrate challenges that may arise from existing sol-gels. FIG. 7A illustrates an example of a sol-gel coating layer 702 using existing sol gel materials on a flat substrate 701 before and after annealing, where sol-gel coating layer 702 may condense and shrink during and after the annealing. FIG. 7B illustrates a substrate 710 including nano- to micro-sized recessed features 724 (e.g., with a period of about 100 nm, and also referred as "recessed feature" 724 hereinafter) and a sol-gel coating layer 720 on recessed features 724 before and after annealing. As shown by FIG. 7B, before annealing, if the thickness of sol-gel coating layer 720 is greater than the depth of recessed features 724, it is possible to fill the high aspect ratio features (e.g., recessed features 724) with the non-annealed film (e.g., sol-gel coating layer 720 before annealing). However, after annealing (e.g., the condensation process), voids 730 may form in recess features 724 due to shrinkage of the sol-gel and aggregations that may form nanoparticles or particulates.

Figure 8A:
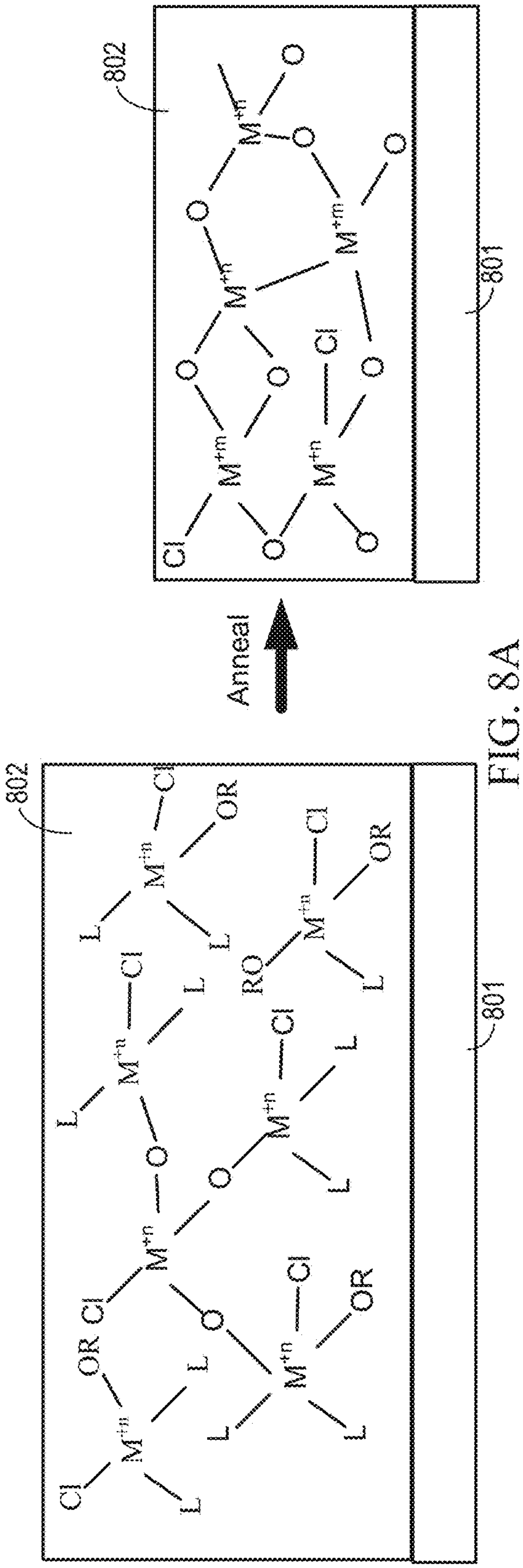
FIG. 8A illustrates a substrate including a sol-gel coating layer deposited on the substrate before and after annealing, where the sol-gel coating layer may include the sol-gel material according to certain embodiments disclosed herein.

FIG. 8A illustrates a substrate including a sol-gel coating layer 802 deposited on a substrate 801 before and after annealing, where sol-gel coating layer 802 may include the sol-gel material according to certain embodiments disclosed herein. In the illustrated example, the sol-gel material may include a metal precursor in an initial oxidation state (+n) (e.g., before annealing); either or both alkoxide and halide ligands; and an oxidizing environment that oxidizes a fraction of the metal precursor during annealing to a second oxidation state (+m), thereby yielding an amorphous mixture of the same metal in at least two different oxidation states after annealing. The amorphous mixture includes a mixture of oxide and/or halide ligands. The sol-gel material may include a mixture where the oxidizing species is either molecular oxygen, peroxide, alcohol, alkoxide, or glycol. After annealing, the sol-gel material may include a condensed mixture of the metal in different oxidation states, where the metal in different oxidation states may be transparent in the presence of either or both alkoxide and halide ligands.

Figure 8B:
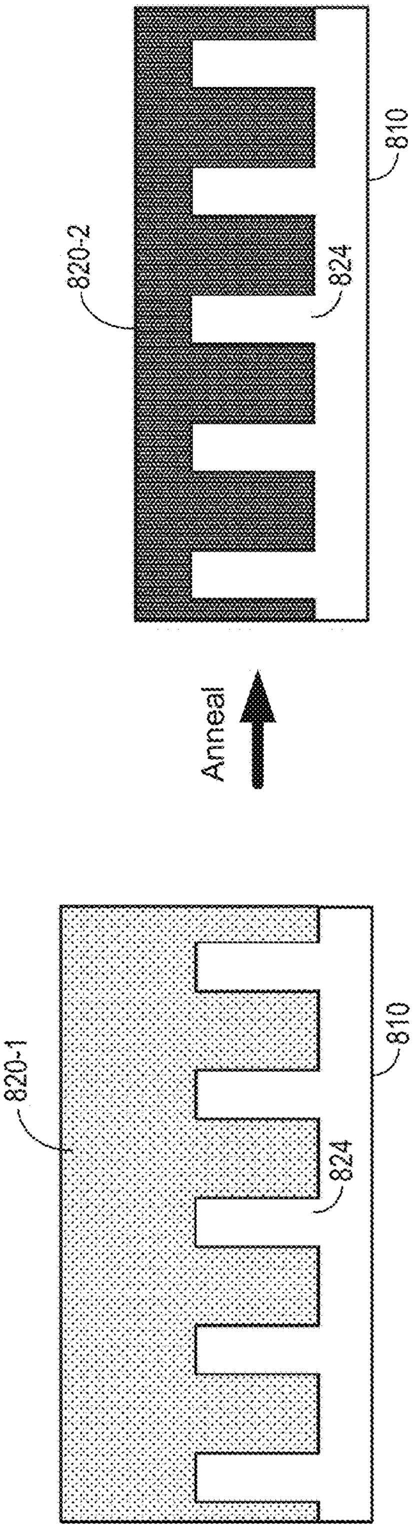
FIG. 8B illustrates a substrate including recessed features and a sol-gel coating layer on the recessed features before and after annealing, where the sol-gel coating layer may include a sol-gel material according to certain embodiments disclosed herein, leading to void-free superconformal fill of the recessed features.

FIG. 8B illustrates a substrate 810 including nano- to micro-sized recessed features 824 (e.g., with a period of about 100 nm, and also referred as "recessed feature" 824 hereinafter) and a sol-gel coating layer 820 on the recessed features before (e.g., sol-gel coating layer 820-1) and after annealing (e.g., sol-gel coating layer 820-2), where sol-gel coating layer 820 may include a sol-gel material according to certain embodiments disclosed herein (e.g., shown in FIG. 8A). By producing a mixture of the same metal in multiple oxidation states, where all oxidation states of the metal are transparent, and where the mixture includes oxide and/or halide ligands, an amorphous state without any noticeable domain formation that would otherwise distribute stress locally and lead to voiding inside nano-gratings may be obtained (e.g., in sol-gel coating layer 820-2). This makes it possible to achieve highly condensed states of the sol-gel with RI values in the 1.7-2.2 range without sacrificing recessed-feature fill.

In some embodiments, a tin(II) precursor including halide ligands may be dissolved in an alcohol or glycol. Upon annealing, the tin(II) mixture is partially oxidized to tin(IV). Both tin(II) and tin(IV) oxides or oxyhalides are transparent to visible light, and the mixtures of the two oxidation states are also transparent. Furthermore, the mixture of tin(II) and tin(IV) oxides or oxyhalides can be condensed to produce coatings with RI values between about 1.7- and about 2.2 that are amorphous, and do not form discrete domains, regardless of the level of condensation. The tin(II):tin(IV) ratio may be maintained in the range of about 1:5 to about 4:1 in order to realize RI values in the range of about 1.7 to about 2.2 without leading to loss of recessed-feature fill capabilities. Advantageously, the condensation process for the tin(II)/tin(IV) mixture can be conducted at temperatures lower than about 300° C.

In some embodiments, a sol-gel solution may include at least one tin(II) halide precursor, where the solvent may include one or more alcohol or glycol, an optional secondary oxo-donor such as a peroxide, and an optional tin(II) stabilizer. In some embodiments, the solution may also contain acids, bases, and/or surfactants. The solvent type or solvent mixture can be adjusted to produce coatings having RIs between 1.7-2.2 after annealing. In some embodiments, the sol-gel material may be coated to a substrate by applying the solution including the sol-gel material onto the substrate via spin-coating, dip-coating, spray-coating, ink-jet printing, screen-printing, or contact-printing, and then the substrate with the sol-gel material may be thermally annealed via at least one stage of thermal annealing (e.g., an annealing at an annealing temperature less than 300° C.). By applying the sol-gel material disclosed herein, any recessed features (e.g., nano- or micro-sized recessed features) in the substrate may be superconformally and void-freely coated, even after the film formed by the sol-gel material is fully densified. Specifically, the film stays in the amorphous state throughout the whole condensation process.

In some embodiments, the sol-gel material may include at least one metal halide precursor and at least one alcohol, and the metal halide is used to form a superconformal optical coating on a surface with nanosized recessed features. Upon thermal annealing, the sol-gel material may produce a coating of metal oxychloride, where the metal is present in at least 2 different oxidation states. After annealing, a resultant sol-gel coating may have a non-stoichiometric oxychloride composition. In some embodiments, in the resultant sol-gel coating, the mixture of the different oxidation states of the metal oxychloride is transparent to visible light (e.g., with an absorption <0.1%/100 nm). In some embodiments, the solvent of the sol-gel material can at least partially act as the source of oxide ligands during thermal curing (e.g., the annealing). Specifically, in the sol-gel material, the metal halide source may be tin(II) chloride. In some embodiments, after the annealing process, the ratio of tin(II) to tin(IV) in the sol-gel material is between 1:5 to 4:1. The ratio can be adjusted by controlling the annealing temperature, the solvent identity, and/or the solvent mixture. After the annealing process, the condensed coating is in an amorphous status.

In some embodiments, the sol-gel material, when coated onto a substrate having recessed features, can be annealed at a temperature no higher than 300° C. for less than 10 minutes to achieve a coating with an RI of 1.7-2.2. After the annealing process, the sol-gel material can fill the recessed features on the substrate in a superconformal fashion without leading to voiding. In some embodiments, the sol-gel material may optionally include stabilizers, acids, bases, peroxides, surfactants, cross-linkers, flexibilizers and toughener additives, and/or solvents. In some embodiments, the stabilizer additive can optionally be one of ethanolamine, diethanolamine, triethanolamine, an aliphatic amine, a diamine, a triamine, or a polyamine. In some other embodiments, the stabilizer additive can be one or a mixture of organic antioxidants or inorganic antioxidants. In some embodiments, the solvent additive of the sol-gel material may optionally be one or a mixture of propylene glycol methyl ether (PGME), dipropylene glycol monomethyl ether (DPGME), propylene glycol methyl ether acetate, tripropylene glycol monomethyl ether, butyl lactate, propylene carbonate, isopropyl alcohol (e.g., 1,3-dimethoxy-2-propanol), methanol, and water.

According to certain embodiments, a method may include applying a sol-gel material made by dissolving or suspending at least one metal chloride precursors in a solvent including at least one alcohol, onto a substrate with the recessed features, and annealing the sol-gel material at a temperature no higher than 300° C., to produce a mixed valence metal oxychloride and achieve superconformal fill of the recessed features with the sol-gel material. In some embodiments, the annealing may be performed in a single stage or multiple stages, where the single stage or multiple stages of the annealing may have annealing temperatures no higher than 300° C. and a total annealing time no longer than 10 min. When applying the sol-gel material to the substrate to superconformally fill recessed features in the substrate, the recessed features can be gratings, trenches, vias, and/or through-holes, with feature widths of 5-200 nm and aspect ratios of 1:1.5 to 1:50 width to depth. The final thickness of the coating on the top surface of the coated substrate may be less than 50 nm and the recessed features may be fully filled with the annealed sol-gel material in a void-free fashion. In some embodiments, the sol-gel material may be applied onto the substrate to form an optical coating via spin-coating, dip-coating, spray-coating, ink-jet printing, screen-printing, or contact-printing. The cured (e.g., annealed) sol-gel coating (e.g., the film layer formed by the sol-gel material) may have an RI between 1.65-2.20 and an absorption of visible light less than 0.1%/100 nm after densification of the coating.

EXAMPLES

I. Comparative Examples 1-3

Figures 9A, 9B:
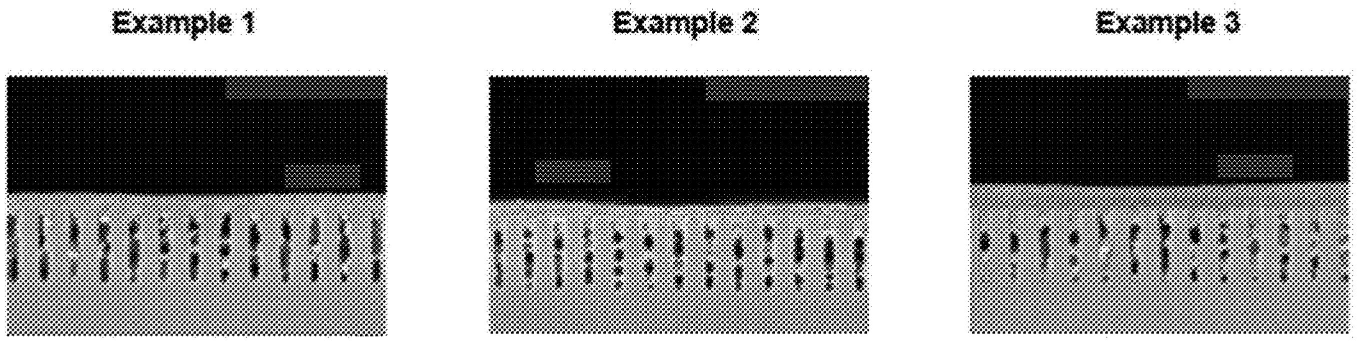
FIG. 9A shows material compositions and performance of comparative examples 1-3.
FIG. 9B shows cross-sectional views of examples of surface-relief gratings with coating layers formed in comparative examples 1-3 under a scanning electron microscope (SEM).

FIG. 9A shows material compositions and performance of comparative examples 1-3. FIG. 9B shows cross-sectional views (e.g., via SEM) of examples of surface-relief gratings with coating layers formed in comparative examples 1-3 under a microscope. As shown in FIGS. 9A and 9B, in comparative example 1, titanium(IV) tetrachloride was dissolved in DPGME solvent. The resultant sol-gel was coated onto a silicon substrate that had been cleaned with an oxygen gas plasma. The substrate contained nano-sized trenches ranging from 15 to 100 nm wide and 220 nm deep. The substrate was then annealed at 150° C., and the sol-gel coating thickness and RI were measured via ellipsometry. As shown in FIG. 9A, it was found that the film's RI was 1.64. Furthermore, the substrate was cross-sectioned and the quality of the trench-fill by the sol-gel was determined via SEM. It was found that the sol-gel did not fill the trenches. Instead, the trenches were only partially filled and contained voids. More specifically, the sol-gel appears to include particle aggregates, regardless of the low level of condensation corresponding to the RI value of 1.64. This result exemplifies that the inability of traditional sol-gel materials to sustain a non-particulate state throughout the anneal process correlates to the inability to achieve superconformal fill of nanosized features. Furthermore, a mixture of titanium (IV) may not be formed with other titanium oxidation states since other available titanium oxidation states are not stable under ambient conditions or are colored in the visible spectrum.

In comparative example 2, hafnium(IV) tetrachloride was dissolved in DPGME solvent. The resultant sol-gel was coated onto a silicon substrate that had been cleaned with an oxygen gas plasma. The substrate contained nano-sized trenches ranging from 15 to 100 nm wide and 220 nm deep. The substrate was then annealed at 150° C., and the sol-gel coating thickness and RI were measured via ellipsometry. As shown in FIG. 9A, it was found that the film's RI was 1.57. Furthermore, the substrate was cross-sectioned and the quality of the trench-fill by the sol-gel was determined via SEM. It was found that the sol-gel did not fill the trenches. Instead, the trenches were only partially filled and contained voids. More specifically, the sol-gel deposit appears to include particle aggregates, regardless of the low level of condensation corresponding to the RI value of 1.57. This result exemplifies the inability of traditional sol-gel materials to sustain a non-particulate state throughout the anneal process correlates to the inability to achieve superconformal fill of nanosized features. Furthermore, a mixture of hafnium (IV) may not be formed with other hafnium oxidation states since other available titanium oxidation states are not stable under ambient conditions or are colored in the visible spectrum.

In comparative example 3, niobium (V) pentachloride was dissolved in DPGME solvent. The resultant sol-gel was coated onto a silicon substrate that had been cleaned with an oxygen gas plasma. The substrate contained nano-sized trenches ranging from 15 to 100 nm wide and 220 nm deep. The substrate was then annealed at 150° C. and the sol-gel coating thickness and RI were measured via ellipsometry. As shown in FIG. 9A, it was found that the film's RI was 1.72. Furthermore, the substrate was cross-sectioned and the quality of the trench-fill by the sol-gel was determined via SEM. It was found that the sol-gel did not fill the trenches. Instead, the trenches were only partially filled and contained voids. More specifically, the sol-gel deposit appears to include particle aggregates, regardless of the low level of condensation corresponding to the RI value of 1.72. This result exemplifies that the inability of traditional sol-gel materials to sustain a non-particulate state throughout the anneal process correlates to the inability to achieve superconformal fill of nanosized features. Furthermore, a mixture of niobium (V) may not be formed with other niobium oxidation states since other available titanium oxidation states are not stable under ambient conditions or are colored in the visible spectrum.

II. Working Examples 4-10

Figure 10B:
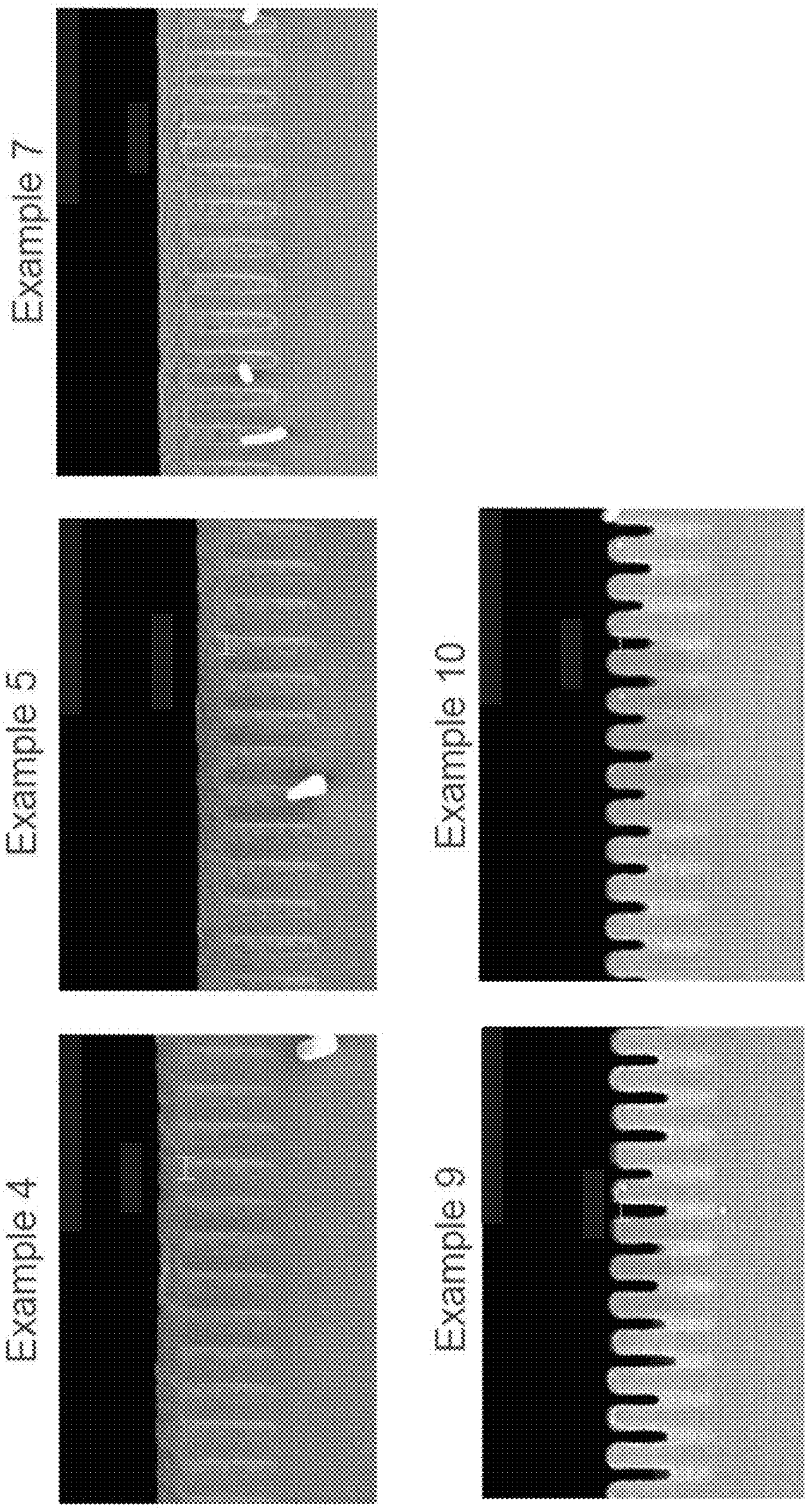
FIG. 10B shows cross-sectional views (e.g., via SEM) of examples of surface-relief gratings with superconformal overcoat layers formed in working examples 4-10 according to certain embodiments.

FIG. 10A shows material compositions and performance of working examples 4-10, and FIG. 10B shows cross-sectional views of examples of surface-relief gratings with superconformal overcoat layers formed in working examples 4-10 under a microscope (e.g., an SEM) according to certain embodiments. Working examples 4-10 reveal the relationship between the RI of the coating (e.g., RI between 1.6-2.2) and the anneal temperature.

In working examples 4-10, tin(II) dichloride was dissolved in DPGME to reach a final tin(II) chloride concentration of 10% by mass, as detailed in FIG. 10A. The resultant sol-gel was coated onto a silicon substrate that had been cleaned with an oxygen gas plasma. The substrate contained nano-sized trenches ranging from 15 to 100 nm wide and 220 nm deep. The substrate was then annealed at a temperature in the 80-200° C. range, and the thickness and RI of the sol-gel coating were measured via ellipsometry. As shown in FIG. 10A, it was found that the film's RI was varied from 1.59 to 2.12 as the film shrinkage increased with increasing annealing temperature. Furthermore, the substrate was cross-sectioned and the quality of the trench-fill by the sol-gel was determined via SEM. It was found that the sol-gel coating penetrated all the trenches fully, and that it remained inside the trenches even after annealing and shrinking. Even in the cases of Examples 9-10, wherein the final coating shrank below the top surface of the nanogratings, the sol-gel still shows a superconformal bottom-up fill behavior. Finally, the sol-gel was coated onto a fused silica substrate. The substrate was then annealed at a temperature in the 80-200° C. range and the absorption of the sol-gel coating was measured via spectrophotometry. It was found that, in all cases, the film absorbance remained smaller than 0.1%. Overall, these results exemplify that a tin(II) precursor containing halide and alcohol ligands can be used to form highly transparent, high RI coatings with recessed-feature fill capabilities.

III. Working Examples 11-12

FIG. 11 shows material compositions and performance of working examples 11-12 according to certain embodiments.

In the working examples 11-12, tin(II) dichloride was dissolved in DPGME to reach a final tin(II) chloride concentration of 10% by mass, as detailed in FIG. 11. The resultant sol-gel was coated onto a fused silica substrate. The substrate was then annealed at a temperature of 150° C. or 185° C. The coating crystallinity was then determined via X-ray diffraction (XRD). As shown in FIG. 11, it was found that neither annealing temperature resulted in any measurable degree of crystallinity. This is consistent with the SEM data from Experiment 8 and Experiment 9, wherein the sol-gel deposit appears continuous and amorphous. Furthermore, the composition of the sol-gel coatings was studied via surface X-ray photoelectron spectroscopy (XPS). It was found that in both cases the material was a tin oxychloride with mixed tin(II)/tin(IV) oxidation state. As shown in FIG. 11, as the temperature increases, the ratio of Sn(II) increases, consistent with the observation that the measured RI also increases with increasing temperature in FIG. 10A. Overall, these results show that the present formulations allow for partial oxidation of the precursor to yield a mixture of metal oxidation states and ligand types. This mixture in turn enables highly condensed films with high RIs, which are still amorphous and can thus retain recessed-feature fill in nanopatterns.

IV. Working Examples 13-17

Figure 12B:
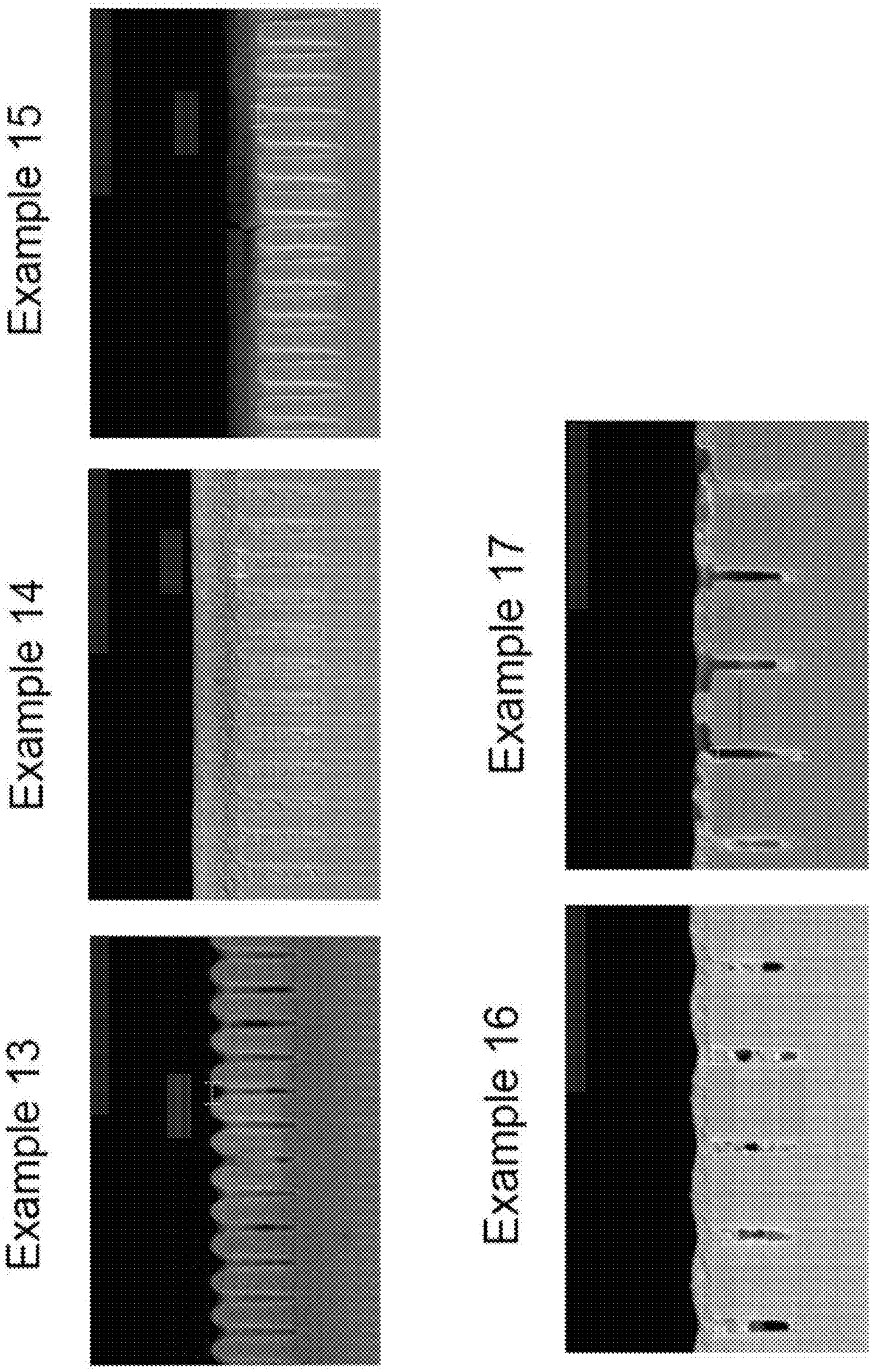
FIG. 12B shows cross-sectional views (e.g., via SEM) of examples of surface-relief gratings with superconformal overcoat layers formed in working examples 13-15 and coating layers formed in working examples 16-17 according to certain embodiments.

FIG. 12A shows material compositions and performance of working examples 13-17, and FIG. 12B shows cross-sectional views (e.g., via SEM) of examples of surface-relief gratings with superconformal overcoat layers formed in working examples 13-15 and coating layers formed in working examples 16-17 under a microscope according to certain embodiments. In the working examples 13-15, tin(II) dichloride was dissolved in either isopropanol, diethylene glycol or propylene glycol methyl ether to reach a final tin(II) chloride concentration of 10% by mass, as detailed in FIG. 12A. The resultant sol-gel was coated onto a silicon substrate that had been cleaned with an oxygen gas plasma. The substrate contained nano-sized trenches ranging from 15 to 100 nm wide and 220 nm deep. The substrate was then annealed at a temperature of 200° C. and the sol-gel RI was measured via ellipsometry. It was found that the RI varied depending on the solvent of choice. The solvent choice may change the balance between the tin(II) and tin(IV) content, as well as the ability of the solvent to act as an oxo donor, thus changing the degree of densification experienced by the film. Furthermore, the substrate was cross-sectioned and the quality of the trench-fill by the sol-gel was determined via SEM. It was found that the sol-gel coating penetrated all the trenches fully, and that it remained inside the trenches even after annealing and shrinking. All sol-gel deposits appeared continuous and amorphous. Overall, these results show that the solvent can be varied in order to modulate the composition and optical properties of the resultant sol-gel coating, without sacrificing recessed-feature fill capabilities.

In the working examples 16-17, tin(II) dichloride was dissolved in either dipropylene glycol butyl ether or diethylene glycol methyl ethyl ether to reach a final tin(II) chloride concentration of 10% by mass, as detailed in FIG. 12A. The resultant sol-gel was coated onto a silicon substrate that had been cleaned with an oxygen gas plasma. The substrate contained nano-sized trenches ranging from 15 to 100 nm wide and 220 nm deep. The substrate was then annealed at a temperature of 200° C. and the sol-gel RI was measured via ellipsometry. It was found that the RI varied depending on the solvent of choice, with the non-alcoholic diethylene glycol methyl ethyl ether producing the highest RI of this set. The solvent choice may change the balance between the tin(II) and tin(IV) content, and non-alcoholic solvents may decrease their oxidizing power and thus increase tin(II) content and resultant RI. Furthermore, the substrate was cross-sectioned and the quality of the trench-fill by the sol-gel was determined via SEM. It was found that the sol-gel did not fill the trenches. Instead, the trenches were only partially filled and contained voids. More specifically, the sol-gel deposit appears to include particle aggregates. These results show that the solvent choice has a large impact on controlling the tin(II) to tin(IV) ratio, varying the film composition and densification, and sustaining the amorphous continuous state that is critical for recessed-feature fill.

V. Working Examples 18-20

FIG. 13 shows material compositions and performance of working examples 18-20 according to certain embodiments. In the working examples 18-20, tin(II) dichloride was dissolved in propylene glycol methyl ether to reach a final tin(II) chloride concentration of 10% by mass, as detailed in FIG. 13. The resultant sol-gel was coated onto a silicon substrate that had been cleaned with an oxygen gas plasma. The substrate contained nano-sized trenches ranging from 15 to 100 nm wide and 220 nm deep. The substrate was then annealed at a temperature of either 120° C., 200° C., or via a dual annealing protocol comprising an initial temperature of 120° C. and a second temperature of 250° C. The sol-gel RI was then measured via ellipsometry. It was found that the final RI varied depending on annealing protocol. Specifically, it was found that the dual anneal sample had an RI that was more similar to the single 120° C. anneal sample than the single 250° C. anneal sample. The initial anneal may control the tin(II) to tin(IV) ratio and oxide versus chloride content. Thus, subsequent anneals at higher temperature will follow a different condensation pathway as compared to films that were directly annealed at the same higher temperature. Furthermore, the substrate was cross-sectioned and the quality of the trench-fill by the sol-gel was determined via SEM. It was found that the sol-gel coating penetrated all the trenches fully, and that it remained inside the trenches even after annealing and shrinking. All sol-gel deposits appeared continuous and amorphous. Overall, these results show that the annealing protocol can be varied in order to modulate the composition and optical properties of the resultant sol-gel coating, without sacrificing recessed-feature fill capabilities.

VI. Working Examples 21-22

FIG. 14 shows material compositions and performance of working examples 21-22 according to certain embodiments. In working examples 21-22, tin(II) dichloride and monoethanolamine were dissolved in dipropylene glycol methyl ether to reach final concentrations of 10% and 1% by mass, respectively, as detailed in FIG. 14. The resultant sol-gel was stored for 1 week in a −20° C. freezer and it was then coated onto a silicon substrate that had been cleaned with an oxygen gas plasma. The substrate contained nano-sized trenches ranging from 15 to 100 nm wide and 220 nm deep. The substrate was then annealed at a temperature of either 150 or 200° C. The sol-gel RI was then measured via ellipsometry. It was found that the ethanolamine stabilizer had a minor impact on the RI and an RI value significantly above 2.0 was still attainable. Furthermore, the substrate was cross-sectioned and the quality of the trench-fill by the sol-gel was determined via SEM. It was found that the sol-gel coating penetrated all the trenches fully, and that it remained inside the trenches even after annealing and shrinking. All sol-gel deposits appeared continuous and amorphous. Finally, the sol-gel was coated onto a fused silica substrate. The substrate was then annealed at a temperature of either 150 or 200° C. and the absorption of the sol-gel coating was measured via spectrophotometry. It was found that, in both cases, the film absorbance remained smaller than 0.1%. Overall, these results show that a stabilizer can be incorporated into the sol-gel to sustain the optical and recessed-feature fill performance over time.

It is understood that the compositions of the sol-gel material described above, e.g., with regard to FIGS. 8A, 8B, and 10A-14 are for illustrative purposes only. Other suitable compositions may also be used. For example, the sol-gel material may include 10%-30% by weight any tin salt disclosed herein, and 70%-90% by weight any suitable solvent mixture disclosed herein.

In some embodiments, additionally or alternatively to the tin salts disclosed above, the tin salt may also include tin dichloride dihydrate and/or anhydrous tin dichloride. Additionally or alternatively to the solvent mixtures disclosed above, the solvent mixture may include about 17%-37% by weight propylene glycol methyl ether, about 57%-77% by weight 1,3-dimethoxy-2-propanol, and about 1%-11% by weight diethylene glycol. Alternatively, the solvent mixture may include about 17%-37% by weight propylene glycol methyl ether, about 57%-77% by weight di(propylene glycol) methyl ether, and about 1%-11% by weight diethylene glycol. Alternatively, the solvent mixture may include about 100% by weight 1,3-dimethoxy-2-propanol.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or a combination of A, B, and/or C, such as AB, AC, BC, AA, ABC, AAB, or AABBCCC.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A sol-gel material comprising:

10%-30% by weight of a tin salt; and

70%-90% by weight of a solvent mixture;

wherein the tin salt comprises:

tin(II) chloride;

tin dichloride dihydrate;

anhydrous tin dichloride; or any combination thereof;

wherein the solvent mixture comprises:

about 17%-37% by weight of propylene glycol methyl ether, about 57%-77% by weight of 1,3-dimethoxy-2-propanol, and about 1%-11% by weight of diethylene glycol; or about 17%-37% by weight of propylene glycol methyl ether, about 57%-77% by weight di(propylene glycol) methyl ether, and about 1%-11% by weight of diethylene glycol; or about 100% by weight of 1,3-dimethoxy-2-propanol.

2. The sol-gel material according to claim 1, wherein the solvent mixture comprises:

27% by weight of propylene glycol methyl ether, 67% by weight of 1,3-dimethoxy-2-propanol, and 6% by weight of diethylene glycol;

27% by weight of propylene glycol methyl ether, 67% by weight of di(propylene glycol)methyl ether, and 6% by weight of diethylene glycol; or 100% by weight of 1,3-dimethoxy-2-propanol.

3. The sol-gel material according to claim 1, wherein the solvent mixture comprises:

about 17%-37% by weight propylene glycol methyl ether, about 57%-77% by weight 1,3-dimethoxy-2-propanol, and about 1%-11% by weight diethylene glycol.

4. The sol-gel material according to claim 1, wherein the solvent mixture comprises 17%-37% by weight of propylene glycol methyl ether, 57%-77% by weight of 1,3-dimethoxy-2-propanol, and 1%-11% by weight of diethylene glycol.

5. The sol-gel material according to claim 1, wherein the solvent mixture comprises 17%-37% by weight of propylene glycol methyl ether, 57%-77% by weight di(propylene glycol)methyl ether, and 1%-11% by weight of diethylene glycol.

6. The sol-gel material according to claim 1, wherein the solvent mixture comprises 100% by weight of 1,3-dimethoxy-2-propanol.

7. The sol-gel material according to claim 1, wherein the tin salt is tin(II) chloride.

8. The sol-gel material according to claim 1, wherein tin salt is tin dichloride dihydrate.

9. The sol-gel material according to claim 1, wherein the tin salt is anhydrous tin dichloride.

10. The sol-gel material of claim 1, further comprising a stabilizer, an acid, a base, a peroxide, a surfactant, a cross-linker, a solvent, or a combination thereof.

11. The sol-gel material of claim 10, wherein the stabilizer comprises an ethanolamine, a diethanolamine, a triethanolamine, an aliphatic amine, a diamine, a triamine, a poly amine, or a combination thereof.

12. The sol-gel material of claim 11, wherein the stabilizer comprises organic antioxidants, inorganic antioxidants, or a combination thereof.

* * * * *